US012572216B2

(12) United States Patent　(10) Patent No.:　US 12,572,216 B2
Diem et al.　(45) Date of Patent:　Mar. 10, 2026

(54) EXTENDED REALITY MOTION PREDICTION USING HAND KINEMATICS

(71) Applicant: Snap Inc., Santa Monica, CA (US)

(72) Inventors: Markus Diem, Vienna (AT); Thomas Muttenthaler, Vienna (AT); Daniel Wolf, Mödling (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/741,375

(22) Filed: Jun. 12, 2024

(65) Prior Publication Data

US 2025/0383715 A1　Dec. 18, 2025

(51) Int. Cl.
G06F 3/01　(2006.01)
(52) U.S. Cl.
CPC .............. G06F 3/017 (2013.01); G06F 3/011 (2013.01)
(58) Field of Classification Search
CPC .......... G06F 3/017; G06F 3/011; G06T 7/251; G06T 7/75; G06T 2200/04; G06T 2207/30196; G06T 2207/10012; G06T 2207/10021; G06T 2207/10016; G06T 2207/10024; G06T 2207/10028; G06T 7/277; G06V 40/28; G06V 20/64; G06V 2201/033
See application file for complete search history.

(56) References Cited

U.S. PATENT DOCUMENTS 4,545,576 A　10/1985　Harris
7,971,156 B2　6/2011　Albertson et al.

9,225,897 B1　12/2015　Sehn et al.
9,276,886 B1　3/2016　Samaranayake
9,705,831 B2　7/2017　Spiegel
9,742,713 B2　8/2017　Spiegel et al.
10,102,423 B2　10/2018　Shaburov et al.
10,284,508 B1　5/2019　Allen et al.
(Continued)

FOREIGN PATENT DOCUMENTS

EP　　3707693　　9/2020
EP　　4172726　　5/2023
(Continued)

OTHER PUBLICATIONS

Cordella, F., "A bio-inspired grasp optimization algorithm for an anthropomorphic robotic hand", International Journal on Interactive Design and Manufacturing, vol. 6, (Mar. 2012), 10 pgs.
(Continued)

*Primary Examiner* — Rodney Amadiz
(74) *Attorney, Agent, or Firm* — Schwegman Lundberg & Woessner, P.A.

(57)　　　　ABSTRACT

Examples in the present disclosure relate to the prediction of motion of a body part by an extended reality (XR) device. Tracking data is captured by one or more sensors associated with the XR device. The tracking data is processed to track the body part. Based on the tracking of the body part and a kinematic model of the body part, kinematic state tracking data is dynamically updated. The kinematic model and the kinematic state tracking data are used to generate a predicted future kinematic state of the body part. In some examples, operation of the XR device is controlled based on the predicted future kinematic state.

20 Claims, 10 Drawing Sheets

(56) References Cited

U.S. PATENT DOCUMENTS

| | | | |
|---|---|---|---|
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,381,743 B1 | 7/2022 | Mahbub et al. | |
| 11,531,402 B1 | 12/2022 | Stolzenberg | |
| 11,546,505 B2 | 1/2023 | Canberk | |
| 11,800,242 B2 | 10/2023 | Holland et al. | |
| 2013/0238295 A1* | 9/2013 | Hyung | G06T 7/251 |
| | | | 703/2 |
| 2015/0062165 A1 | 3/2015 | Saito | |
| 2017/0123487 A1 | 5/2017 | Hazra et al. | |
| 2019/0146219 A1 | 5/2019 | Rodriguez, II | |
| 2020/0084387 A1 | 3/2020 | Baldwin et al. | |
| 2021/0011612 A1 | 1/2021 | Dancie et al. | |
| 2021/0074016 A1 | 3/2021 | Li et al. | |
| 2021/0133452 A1* | 5/2021 | Berkovich | H04N 23/45 |
| 2021/0166732 A1 | 6/2021 | Shaburova et al. | |
| 2021/0174034 A1 | 6/2021 | Retek et al. | |
| 2021/0232232 A1* | 7/2021 | Wang | G06T 7/75 |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0198682 A1* | 6/2022 | Oh | G06T 7/277 |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0214027 A1 | 7/2023 | Erivantcev et al. | |
| 2023/0260155 A1 | 8/2023 | Zhang et al. | |
| 2024/0169677 A1* | 5/2024 | Challapalli | G06N 3/044 |
| 2025/0068228 A1 | 2/2025 | Chatzikalymnios et al. | |

FOREIGN PATENT DOCUMENTS

| | | |
|---|---|---|
| EP | 4172730 | 5/2023 |
| KR | 20220158824 | 12/2022 |
| WO | 2019094618 | 5/2019 |
| WO | 2022005687 | 1/2022 |
| WO | 2022005693 | 1/2022 |
| WO | 2022005708 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | WO-2023044233 A1 | 3/2023 |
| WO | WO-2025043109 A1 | 2/2025 |

OTHER PUBLICATIONS

"International Application Serial No. PCT/US2024/043473, International Search Report mailed Nov. 25, 2024", 4 pgs.

"International Application Serial No. PCT/US2024/043473, Written Opinion mailed Nov. 25, 2024", 7 pgs.

"U.S. Appl. No. 18/478,853, Non Final Office Action mailed Aug. 29, 2025", 11 pgs.

"International Application Serial No. PCT/US2025/033115, International Search Report mailed Aug. 21, 2025", 3 pgs.

"International Application Serial No. PCT/US2025/033115, Written Opinion mailed Aug. 21, 2025", 8 pgs.

* cited by examiner

100

REAL-WORLD ENVIRONMENT

110

XR DEVICE

PHYSICAL OBJECT

108

USER

106

102

104 NETWORK

112 SERVER

110

XR DEVICE

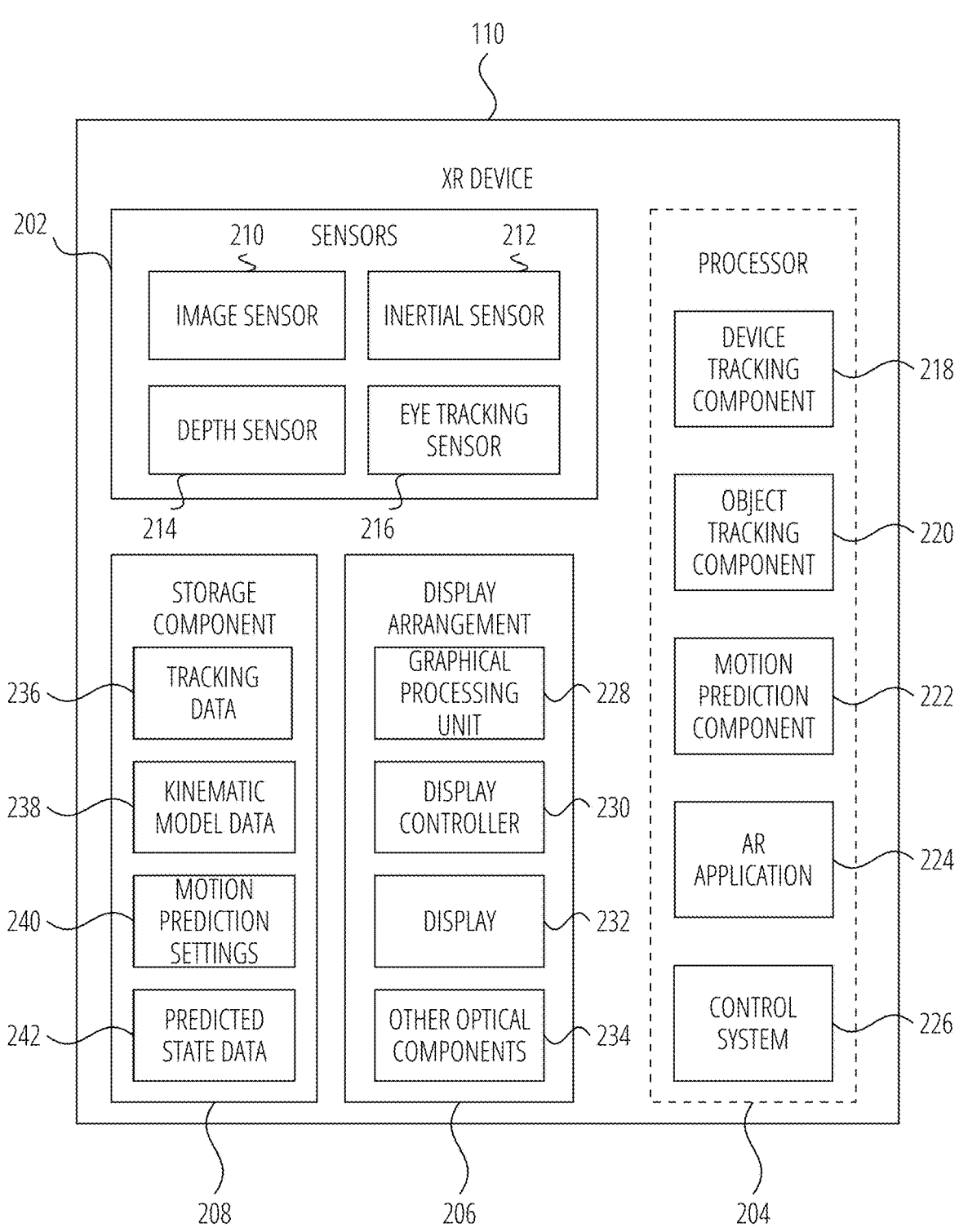

202

SENSORS 210    212

IMAGE SENSOR    INERTIAL SENSOR

DEPTH SENSOR    EYE TRACKING SENSOR 214    216

STORAGE COMPONENT

236    TRACKING DATA

238    KINEMATIC MODEL DATA

240    MOTION PREDICTION SETTINGS

242    PREDICTED STATE DATA

DISPLAY ARRANGEMENT

GRAPHICAL PROCESSING UNIT    228

DISPLAY CONTROLLER    230

DISPLAY    232

OTHER OPTICAL COMPONENTS    234

PROCESSOR

DEVICE TRACKING COMPONENT    218

OBJECT TRACKING COMPONENT    220

MOTION PREDICTION COMPONENT    222

AR APPLICATION    224

CONTROL SYSTEM    226

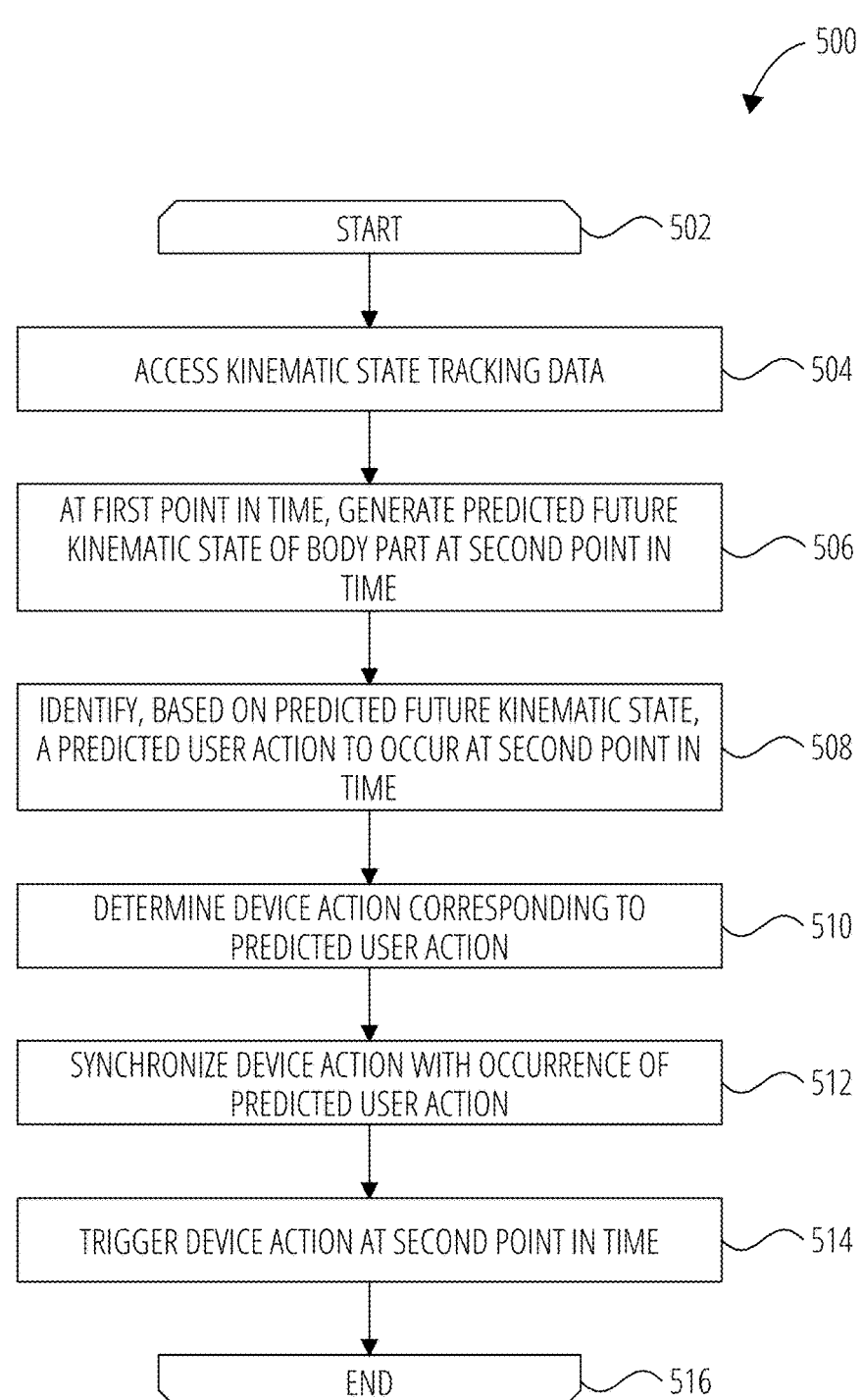

500

START ~502

ACCESS KINEMATIC STATE TRACKING DATA ~504

AT FIRST POINT IN TIME, GENERATE PREDICTED FUTURE KINEMATIC STATE OF BODY PART AT SECOND POINT IN TIME ~506

IDENTIFY, BASED ON PREDICTED FUTURE KINEMATIC STATE, A PREDICTED USER ACTION TO OCCUR AT SECOND POINT IN TIME ~508

DETERMINE DEVICE ACTION CORRESPONDING TO PREDICTED USER ACTION ~510

SYNCHRONIZE DEVICE ACTION WITH OCCURRENCE OF PREDICTED USER ACTION ~512

TRIGGER DEVICE ACTION AT SECOND POINT IN TIME ~514

END ~516

FIG. 5

EXTENDED REALITY MOTION PREDICTION USING HAND KINEMATICS

TECHNICAL FIELD

Subject matter in the present disclosure relates, generally, to extended reality (XR) devices. More specifically, but not exclusively, the subject matter relates to the prediction of motion of a body part, such as a hand, by an XR device.

BACKGROUND

Many XR devices include tracking systems. For example, a tracking system of an XR device processes images captured by one or more cameras of the XR device to determine positions of landmarks or other visual features in a scene. This enables the XR device to track an object, such as a hand, within a field of view of the XR device.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 2 is a block diagram illustrating components of an XR device, according to some examples.

FIG. 5 is a flowchart illustrating operations of a method suitable for using kinematic state tracking data to synchronize a device action performed by an XR device with a predicted user action of a user of the XR device, according to some examples.

DETAILED DESCRIPTION

Figure 1:
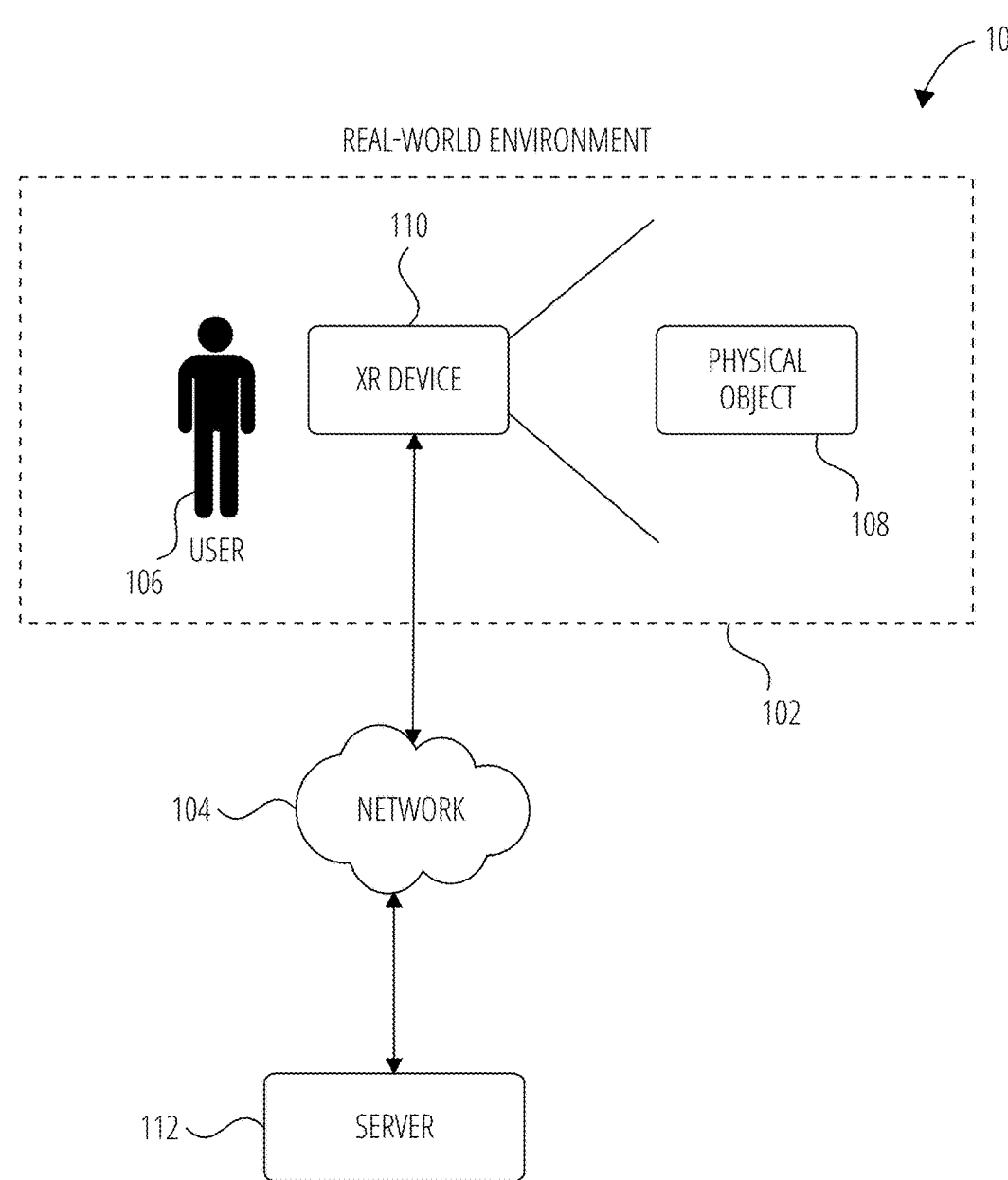
FIG. 1 is a block diagram illustrating a network environment for operating an XR device, according to some examples.

The description that follows describes systems, devices, methods, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Many XR devices perform object tracking. For example, objects in the real world are tracked to provide realistic, entertaining, or useful XR experiences, which can include displaying virtual content based on the position or movements of a tracked object. Some XR devices use hand gestures as an input. This enables a user to interact with an XR device without a traditional input device, such as a touchpad or controller, but typically requires swift and accurate detection and tracking of the hand.

Hand tracking can involve identifying or estimating positions of landmarks on the hand. For example, the three-dimensional (3D) positions of fingers, bones or other segments, finger tips, and/or joints on the hand are estimated to determine the pose (e.g., position and orientation) of the hand. In some examples, coordinates of landmarks are estimated in 3D space relative to the XR device or within some other frame of reference. This enables the XR device to detect gestures or selections made by the user using their hand. In some examples, the XR device also estimates and tracks 3D rotation of the hand, or parts thereof, allowing for six degrees-of-freedom (6DoF) pose tracking.

Various sensors can be used to obtain tracking data. For example, one or more cameras of the XR device can capture images depicting the hand to enable hand tracking. Depth sensors can also be used to obtain depth information related to the hand relative to the XR device. As another example, one or more motion tracking sensors can be attached to the hand to obtain measurements that can describe how the hand's position or orientation changes over time.

The processing of tracking data to compute the position and/or orientation of the hand, or parts thereof, takes time. As a result, this can introduce delays into XR processes. For example, during a user session, the XR device presents a virtual button to the user in such a manner that it appears to be overlaid on a table in the real world. The user moves their hand towards the virtual button and engages with it (e.g., the user's index finger reaches the zone where the virtual button is presented), thereby "pressing" the virtual button on the table. However, it takes time for the XR device to process the relevant tracking data and establish that the hand has reached the virtual button. As a result, the XR device does not react to the "pressing" of the virtual button immediately, but rather with some latency.

As another example, during a user session, the user moves their hand so as to engage a virtual object (e.g., a virtual menu) and performs a dragging gesture to move the virtual object to a different zone in the field of view. Since it takes time for the XR device to process the relevant tracking data, detect commencement of the dragging gesture, and cause the virtual object to move in response thereto, movement of the virtual object is not fully aligned with movement of the hand (e.g., the virtual object appears to trail the user's dragging gesture).

Technical issues such as those described above can degrade the user experience by making it less smooth and realistic. For instance, the user unnecessarily retries or restarts an input (e.g., the user attempts the virtual button "press" again, or restarts the dragging gesture) due to confusion as to whether the XR device has registered the input.

Examples described herein address technical challenges by overcoming or addressing the aforementioned delay, at least to some extent, through the use of a kinematic model of a hand. In some examples, an XR device continuously computes joint positions and joint angles (e.g., angles between segments connected by each joint) of a hand over time, leveraging a kinematic model to track the hand's kinematic state and to predict the joint positions and joint angles at a future point in time. This allows the XR device to trigger device actions timeously such that they are substantially synchronized with user actions, reducing the perceived latency of hand-related interactions during a user session on the XR device. This can also allow for more efficient usage of XR device resources.

XR devices can include augmented reality (AR) devices or virtual reality (VR) devices. "Augmented reality" (AR) can include an interactive experience of a real-world environment where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or 3D registration of virtual and real objects. In some examples, a user of an AR system can perceive or interact with virtual content that appears to be overlaid on or attached to a real-world physical object. The term "AR application" is used herein to refer to a computer-operated application that enables an AR experience.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While examples described in the present disclosure focus primarily on XR devices that provide an AR experience, it will be appreciated that one or more aspects of the present disclosure may also be applied to VR.

A "user session" is used herein to refer to an operation of an application during periods of time. For example, a user session refers to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the session starts when the user runs or starts an AR application, or runs or starts a particular feature of the AR application, and stops when the user ends the AR application or stops the particular features of the AR application.

A "kinematic model," as used herein, can include a mathematical or computational representation of an object and physical movements (or movement capabilities) thereof, where the object's motion is defined by joints and links. A kinematic model typically describes or defines possible movements in terms of the geometry of the object and the constraints imposed by the joints, which may only allow certain types of movement, such as certain rotational or translational movements. For example, in the context of a hand, a kinematic model can detail each of a plurality of fingers as a series of segments (e.g., bones) connected by joints that can rotate or translate in specific ways. The kinematic model may thus define motion constraints governing a hand's movement. The kinematic model of the hand may also be referred to as a "skeleton model."

It is noted that a "kinematic model of a hand" does not necessarily include all parts of the hand. For example, the kinematic model can detail only the thumb and index finger, or only the thumb, index finger, and middle finger, including their respective joints and links, without describing similar details for the other fingers. Accordingly, it will be understood that references in the present disclosure to a kinematic model of a hand may refer to a representation of all or part of the hand.

A "kinematic state," as used herein, can include data describing the position and/or orientation of an object (or part thereof) as defined by a kinematic model at a given time. For example, the kinematic state includes values of variables that describe the configuration, positioning, and/or orientation of the object, such as positions of joints and angles between segments. In some examples, a kinematic state additionally, or alternatively, includes information describing the velocity or angular velocity of the object or parts thereof, and/or other higher order derivatives, such as acceleration. Kinematic state tracking data can include the kinematic state as tracked across a series of time points or intervals, illustrating how the kinematic state changes over time. In some examples, at least part of the kinematic state is determined by fitting tracking data (e.g., data from XR device sensors) to the relevant kinematic model.

An example method includes accessing tracking data captured via one or more sensors associated with the XR device, and processing the tracking data to track at least one body part. In some examples, the XR device is a head-mounted XR device, and the at least one body part comprises a hand. The hand can be the hand of a user of the XR device or the hand of another person tracked (or to be tracked) by the XR device.

As used herein, "tracking data" may include data captured by one or more sensors that describe (or can be processed to describe) the movement, position, orientation, angle, rotation, or other kinematic properties of an object or body part, such as a human hand. Tracking data may be captured by various sensors, such as optical sensors (e.g., cameras), inertial sensors (e.g., trackers attached to the hand), or depth sensors. Tracking data can be processed to determine positions of joints and orientations of bones or other segments of a hand. In some examples, tracking data includes, or is processed to provide, the positions of joints. These positions may be provided as landmarks, such as 3D coordinates of respective joints. Tracking data can be processed to determine motion information, such as velocities or accelerations. In some examples, tracking data can include or directly provide such motion information. For example, a sensor attached to the hand can measure the velocity or acceleration of the hand or part/s thereof.

In some examples, the method includes, based on the tracking of the at least one body part, dynamically updating a kinematic state that is tracked for the at least one body part. This can include generating kinematic state tracking data that tracks the kinematic state of the at least one body part over time using a kinematic model. The kinematic model and/or kinematic state tracking data can be used to generate a predicted future kinematic state. In some examples, the kinematic model defines motion constraints that are applied to generate the predicted future kinematic state. The predicted future kinematic state is applied to control operation of the XR device.

In some examples, the tracking data is processed to track positions of a plurality of landmarks comprising a plurality of joints of the hand, with the kinematic model describing joint positions and joint angles.

In some examples, the XR device executes a landmark detection machine learning model to obtain, from tracking data, landmarks such as joint positions (e.g., respective sets of 3D coordinates with their associated joint identifiers). In some examples, the system processes the tracking data to directly estimate or output a kinematic state (e.g., relative joint positions and angles as defined by the kinematic model) without an intermediate step of obtaining preliminary landmark values.

Dynamically updating the kinematic state tracking data can include tracking, over time, at least one of linear velocity of one or more of the plurality of joints, angular velocity of one or more of the plurality of joints, linear acceleration of one or more of the plurality of joints, angular acceleration of one or more of the plurality of joints, linear jerk of one or more of the plurality of joints, or angular jerk of one or more of the plurality of joints. Kinematic state data can thus include, for example, information describing respective velocities, accelerations, jerks, or the like, of joints or other hand landmarks.

In some examples, the predicted future kinematic state is generated at a first point in time to predict a kinematic state of the at least one body part at a second point in time. The second point in time is, for example, less than 2 seconds, less than 1.5 seconds, less than 1 second, or less than 0.5 seconds from the first point in time. In this way, the XR device can utilize the predicted future kinematic state to determine how to control operations at or in preparation for the second point in time.

As mentioned, operation of the XR device can be controlled based on the predicted future kinematic state. Controlling of the XR device can include identifying, based on the predicted future kinematic state, a predicted user action. For example, the XR device predicts, based on the predicted future kinematic state, that the user will perform a detectable gesture at a future point in time (e.g., the user will perform a "select" gesture to press a virtual button, or will perform a "dragging" gesture to start moving a virtual object).

In some examples, the XR device determines a device action corresponding to the predicted user action. For example, the XR device determines a response to the predicted gesture, or determines virtual content to be rendered for presentation to the user. In some examples, the method includes synchronizing the device action with occurrence of the predicted user action. For example, the XR device predicts that the user will "press" a virtual button at the second point in time, and causes a corresponding reaction to the button "press" to be performed at (or shortly following) the second point in time, thereby providing a smooth XR experience.

The predicted future kinematic state can be utilized by the XR device to select a mode of operation for one or more sensors. For example, where the XR device includes a plurality of sensors, such as multiple cameras, the method can include controlling the operation of the XR device based on the predicted future kinematic state by dynamically selecting, based on the predicted future kinematic state, a subset of the plurality of sensors for tracking of the at least one body part.

In some examples, the mode of operation is selected for a multi-camera object tracking system of the XR device. For example, a subset of cameras of the multi-camera object tracking system is dynamically selected based on the predicted future kinematic state (e.g., the predicted pose of the hand relative to a field of view of each respective camera of the plurality of cameras).

In examples in the present disclosure, once the XR device has predicted the future kinematic state of the body part, operation of the XR device is automatically controlled using such information. The XR device performs, for instance, gesture detection based on the predicted future kinematic state, responds to a gesture that is predicted to be performed or completed, or renders a user interface element.

As mentioned, subject matter in the present disclosure addresses technical challenges associated with perceived latency when using an XR device. High latency degrades the user experience, as there can be a noticeable delay between a user's action and the device's response, which can disrupt the immersive experience and reduce usability for real-time applications. Examples described herein address or alleviate the issue of latency in hand tracking systems by dynamically updating a kinematic state using a kinematic model and based on real-time tracking of the hand. By using a kinematic model, the system can better anticipate the position and movement of the hand. This predictive capability allows the XR device to predict the user's hand movements and adjust the XR environment accordingly, in near real-time.

Technical problems can arise in predicting complex hand movements using conventional hand tracking systems. For example, traditional models can fail to accurately predict the position and orientation of a particular finger, especially when movements involve rapid or subtle gestures. This can lead to errors in interaction or XR device outputs. To improve the accuracy of predicting complex hand movements, examples in the present disclosure utilize a kinematic model that describes joint positions and joint angles. This allows for tracking of linear and angular velocities, accelerations, and/or jerks or other higher order motion derivatives of the joints. By generating a predicted future kinematic state based on this model (e.g., taking into account past movements and motion constraints), the XR device can more accurately forecast intricate movements of fingers.

Examples described herein can also address or alleviate inefficient utilization of sensors, such as cameras of an XR device. For example, the use of a multi-camera object tracking system can increase power consumption and computational overhead. By using the predicted future kinematic state to dynamically select a subset of cameras to perform tracking (e.g., only the one or more cameras that are predicted to have the best view of the relevant part of the hand), resources can be more efficiently used. For example, the XR device can ensure that only the necessary sensors are used at a particular time, while still tracking the relevant object in a satisfactory manner. This may be particularly beneficial in mobile XR device applications where power efficiency is a concern.

While examples described herein focus primarily on tracking of a hand, or part of a hand, it is noted that at least some of the techniques described herein can also be applied to tracking and motion prediction performed with respect to other objects that can be represented using kinematic models. For example, a kinematic model of more or other body parts (e.g., the leg of a person, the arm of a person, the entire human body, an animal body, or even parts of a machine) can be utilized, with techniques described herein being applied to predict a future kinematic state of such body part or parts.

Furthermore, while examples in the present disclosure focus mainly on tracking performed by an XR device, it will be appreciated that at least some of the techniques described herein, such as techniques involving a kinematic model of a hand, can be utilized by other devices or systems, such as human motion tracking systems or gesture detection systems that do not include XR devices.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., 3D models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 of FIG. 1 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In some examples, the display of the device is transparent or semi-transparent. In some examples, the display is non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional (2D) physical object (e.g., a picture), a 3D physical object (e.g., a statue), a location (e.g., at a factory), or any references (e.g., perceived corners of walls or furniture, or Quick Response (QR) codes) in the real-world environment 102. For example, the user 106 points a camera of the XR device 110 to capture an image of the physical object 108 and a virtual overlay is presented over the physical object 108 via the display.

Experiences may also be triggered or enhanced by a hand or other body part of the user 106. For example, the XR device 110 detects and responds to hand gestures. The XR device 110 may also present information content or control items, such as user interface elements, to the user 106 during a user session. In some examples, the user 106 can manipulate, select, and/or otherwise interact with such content or items using their hand.

The XR device 110 includes one or more tracking systems or tracking components (not shown in FIG. 1). The tracking components track the pose (e.g., position and orientation) of the XR device 110 relative to the real-world environment 102 using image sensors (e.g., depth-enabled 3D camera, or image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. The tracking components can also track the pose of real-world objects, such as the physical object 108 or the hand of the user 106.

In some examples, the server 112 is used to detect and identify the physical object 108 based on sensor data (e.g., image and depth data) from the XR device 110, and determine a pose of the XR device 110 and the physical object 108 based on the sensor data. The server 112 can also generate a virtual object or other virtual content based, for example, on the pose of the XR device 110 and the physical object 108.

In some examples, the server 112 communicates virtual content to the XR device 110. In other examples, the XR device 110 obtains virtual content through local retrieval or generation. The XR device 110 or the server 112, or both, can perform image processing, object detection, and object tracking functions based on images captured by the XR device 110 and one or more parameters internal or external to the XR device 110.

The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

Machines, components, or devices shown in FIG. 1 may be implemented in a general-purpose computer modified (e.g., configured or programmed) by software to be a special-purpose computer to perform one or more of the functions described herein for that machine, component, or device. For example, a computer system able to implement one or more of the methodologies described herein is discussed below with respect to FIG. 11. Two or more of the machines, components, or devices illustrated in FIG. 1 may be combined into a single machine, and the functions described herein for any single machine, component, or device may be subdivided among multiple machines, component, or devices.

The network 104 may be any network that enables communication between or among machines (e.g., server 112), databases, components, and/or devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

FIG. 2 is a block diagram illustrating components (e.g., modules, parts, systems, or subsystems) of the XR device 110, according to some examples. The XR device 110 is shown to include sensors 202, a processor 204, a display arrangement 206, and a storage component 208. It will be appreciated that FIG. 2 is not intended to provide an exhaustive indication of components of the XR device 110.

The sensors 202 include one or more image sensors 210, one or more inertial sensors 212, one or more depth sensors 214, and one or more eye tracking sensors 216. The image sensor 210 includes one or more of a color camera, a thermal camera, or a grayscale, global shutter tracking camera. The image sensor 210 may include more than one of the same cameras (e.g., multiple color cameras).

The inertial sensor 212 includes, for example, a combination of a gyroscope, accelerometer, and a magnetometer. In some examples, the inertial sensor 212 includes one or more Inertial Measurement Units (IMUs). An IMU enables tracking of movement of a body by integrating the acceleration and the angular velocity measured by the IMU. An IMU may include a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement. In some examples, the magnetic field is measured by the magnetometer to provide a reference for orientation, helping to correct any drift in the gyroscope and/or accelerometer measurements, thereby improving the overall accuracy and stability of the estimations.

The depth sensor 214 may include one or more of a structured-light sensor, a time-of-flight sensor, a passive stereo sensor, and an ultrasound device. The eye tracking sensor 216 is configured to monitor the gaze direction of the user, providing data for various applications, such as adjusting the focus of displayed content or determining a zone of interest in the field of view. The XR device 110 may include one or multiple eye tracking sensors 216, such as infrared eye tracking sensors, corneal reflection tracking sensors, or video-based eye-tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 implements or causes execution of a device tracking component 218, an object tracking component 220, a motion prediction component 222, an AR application 224, and a control system 226.

The device tracking component 218 estimates and/or tracks a pose of the XR device 110. For example, the device tracking component 218 uses data from the image sensor 210 and the inertial sensor 212 to track the pose of the XR device 110 relative to a frame of reference (e.g., real-world environment 102). In some examples, the device tracking component 218 uses tracking data to determine the pose of the XR device 110. The pose is a determined orientation and position of the XR device 110 in relation to the user's real-world environment 102. The device tracking component 218 continually gathers and uses updated sensor data describing movements of the XR device 110 to determine updated poses of the XR device 110 that indicate changes in the relative position and orientation of the XR device 110 from the physical objects in the real-world environment 102.

A "SLAM" (Simultaneous Localization and Mapping) system or other similar system may be used to understand and map a physical environment in real-time. This allows, for example, the XR device 110 to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system, e.g., to perform the "Localization" function of the SLAM system.

The object tracking component 220 enables the tracking of an object, such as the physical object 108 of FIG. 1, or a hand of the user 106 of FIG. 1. The object tracking component 220 may include one or multiple computer-operated applications or systems that enable a device or system to track visual features identified in images captured by one or more of the image sensors 210, such as one or more cameras. In some examples, the object tracking system builds a model of a real-world environment based on the tracked visual features. An object tracking system may implement one or more object tracking machine learning models to detect and/or track an object in the field of view of a user during a user session.

In some examples, an object tracking machine learning model comprises a neural network trained on suitable training data to identify and track objects in a sequence of frames captured by the XR device 110. It typically uses an object's appearance, motion, landmarks, and/or other features to estimate location in subsequent frames.

In some examples, the object tracking component 220 provides a multi-camera object tracking system. To implement a multi-camera object tracking system, multiple cameras of the image sensors 210 (e.g., a top left camera, a top right camera, a bottom left camera, and a bottom right camera when viewed from the front of the XR device 110) can be strategically placed on the XR device 110, e.g., on a frame of the XR device 110. The cameras may be arranged to increase an overall field of view and provide partially overlapping coverage. During operation, the cameras capture video frames of the real-world environment 102 at a specified frame rate (which may differ between cameras). The frames are then processed by the multi-camera object tracking system to extract visual features or other information using one or more computer vision techniques. Examples of such techniques include template matching, edge detection, and feature point extraction. The multi-camera object tracking system may employ stereo matching techniques to facilitate or provide depth estimation.

In some examples, the object tracking component 220 implements a landmark detection system (e.g., using a landmark detection machine learning model). For example, based on images captured using stereo cameras of the image sensors 210, the object tracking component 220 identifies 3D landmarks associated with joints of a hand of the user 106. In other words, the object tracking component 220 can detect and track the 3D positions of various joints (or other landmarks, such as bones or other segments of the hand) on the hand as the hand moves in the field of view of the XR device 110.

In some examples, positions and orientations (e.g., relative angles) of the landmarks are tracked. For example, the object tracking component 220 can output positions of joints and angles of hand segments in accordance with a kinematic model of the hand. As another example, the object tracking component 220 can first obtain 3D positional information, which is then fitted to the kinematic model via inverse kinematics to obtain angles of hand segments in accordance with the kinematic model, thereby providing information about a kinematic state of the hand. The kinematic state of the hand can be described by positions and/or angles, such as joint locations and angles, and/or motion information, such as the velocity or acceleration of respective joints of the hand.

Where the tracked object is a hand, the kinematic state data enables the object tracking component 220 to track the pose of the hand or part thereof. In some examples, the object tracking component 220 continually gathers and updates kinematic state data to understand changes in the relative position and orientation of joints or other segments. This can enable the object tracking component 220 to accurately track motion of the hand, or part thereof, such as the velocity, angular velocity, acceleration, and/or angular acceleration of one or more joints of the hand.

It is noted that 3D positions of landmarks can be obtained in different ways. For example, in addition to images captured using cameras, the XR device 110 can use the depth sensor 214 to identify 3D landmarks. As another example, one or more tracking units (e.g., IMUs) worn on or held by a hand of a user can communicate with the XR device 110 to provide 3D positions or improve the accuracy of 3D position estimations. Such one or more tracking units can also provide motion information, such as acceleration data describing measured acceleration associated with one or more points on the hand.

In some examples, the object tracking component 220 is calibrated for a specific set of features. For example, when the object tracking component 220 performs hand tracking, a calibration component calibrates the object tracking component 220 by using a hand calibration, such as a hand size calibration for a particular user of the XR device 110. The calibration component can perform one or more calibration steps to measure or estimate hand features, such as the size of a hand and/or details of hand landmarks (e.g., fingers and joints). This may include bone length calibrations. Calibration data may be used to personalize a kinematic model of the hand, at least to some extent.

The motion prediction component 222 is responsible for generating predicted future kinematic states of tracked objects. For example, based on current and historical kinematic state tracking data and motion constraints as defined by a kinematic model of the hand, the motion prediction component 222 forecasts the movements and/or positions of the hand (or part thereof) at future points in time. In some examples, the motion prediction component 222 processes data related to the linear and angular velocities, accelerations, and/or other dynamic characteristics of the joints to enhance the accuracy of its predictions.

In some examples, the motion prediction component 222 utilizes a machine learning model that is trained to predict a future kinematic state of an object based on input data. For example, the machine learning model can be trained to predict, based on previous kinematic states of the hand and/or its tracked motion, as well as motion constraints defined by a kinematic model, the most likely future kinematic state of the hand. In other examples, the motion prediction component 222 utilizes non-machine learning techniques, such as a processor-implemented rules-based engine, to generate the predicted future kinematic state.

The AR application 224 may retrieve a virtual object (e.g., 3D object model) based on an identified physical object 108 or physical environment (or other real-world feature), or retrieve an augmentation or digital effect to apply to the physical object 108. A graphical processing unit 228 of the display arrangement 206 causes display of the virtual object, augmentation, digital effect, or the like. In some examples, the AR application 224 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

In some examples, the AR application 224 can communicate with the object tracking component 220 and the motion prediction component 222 to obtain information regarding the poses of objects. For example, the AR application 224 can receive a predicted kinematic state comprising a predicted pose of the hand of the user 106 associated with a future time point, and cause generation of virtual content at the appropriate position and/or at the appropriate angle based on the predicted pose (at the future time point).

The control system 226 of the XR device 110 can control various settings, modes, or operations of the XR device 110. In some examples, the control system 226 is configured to control operation of the XR device 110 based on a predicted future kinematic state of a tracked body part, such as the hand of the user. For example, the control system 226 instructs the AR application 224 and/or graphical processing unit 228 as to the manner in which virtual content is to be generated to ensure that it is synchronized with a predicted position and orientation of the hand. The control system 226 can work with the AR application 224 and/or other components (e.g., the graphical processing unit 228) to cause appropriate device actions, such as the presentation of a menu item or the triggering of an XR experience, to be provided at the correct time. In some examples, the control system 226 dynamically adjusts operation of various device components, such as selecting which of the sensors 202 (e.g., cameras) to activate, based on the predicted movements, thereby making resource usage more efficient.

The graphical processing unit 228 may include a render engine that is configured to render a frame of a 3D model of a virtual object based on the virtual content provided by the AR application 224 and the pose of the XR device 110 (and, in some cases, the position of a tracked object). In other words, the graphical processing unit 228 uses the pose of the XR device 110 to generate frames of virtual content to be presented on the display 232. For example, the graphical processing unit 228 uses the pose to render a frame of the virtual content such that the virtual content is presented at an orientation and position in the display 232 to properly augment the user's reality.

As an example, the AR application 224 cooperates with the graphical processing unit 228, using the pose data to render a frame of virtual content such that, when presented on the display 232, the virtual content is caused to be presented to a user so as to overlap with a physical object in the user's real-world environment 102. The AR application 224 can work with the graphical processing unit 228 to generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

In some examples, the graphical processing unit 228 transfers a rendered frame to the display controller 230. The display controller 230 is positioned as an intermediary between the graphical processing unit 228 and the display 232, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 232.

In some examples, the display 232 is not directly in the gaze path of the user. For example, the display 232 can be offset from the gaze path of the user and other optical components 234 direct light from the display 232 into the gaze path. The other optical components 234 include, for example, one or more mirrors, one or more lenses, or one or more beam splitters.

It will be appreciated that, in examples where an XR device includes multiple displays, each display can have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement can deliver separate images or video streams to each eye. Where an XR device includes multiple displays, steps may be carried out separately and substantially in parallel for each display, in some examples, and pairs of features or components may be included to cater for both eyes.

For example, an XR device captures separate images for a left eye display and a right eye display (or for a set of right eye displays and a set of left eye displays), and renders separate outputs for each eye to create a more immersive experience and to adjust the focus and convergence of the overall view of a user for a more natural, 3D view. Thus, while a single set of display arrangement components is shown in FIG. 2, similar techniques may be applied to cover both eyes by providing a further set of display arrangement components.

Still referring to FIG. 2, the storage component 208 stores various data, such as tracking data 236, kinematic model data 238, motion prediction settings 240, and/or predicted state data 242. The tracking data 236 may include data obtained from one or more of the sensors 202, such as image data from the image sensor 210, eye tracking data from the eye tracking sensor 216, depth maps generated by the XR device 110, or the like. The tracking data 236 can also include data related to the position, velocity, and/or acceleration of a user's hand movements.

In some examples, the tracking data 236 includes "raw" data obtained from the sensors, and the "raw" data is processed by the object tracking component 220 to determine the kinematic model data 238. For example, the tracking data 236 includes image data, and the image data is processed by the object tracking component 220 to generate the kinematic model data 238. The kinematic model data 238 may include data relating to a kinematic model itself as well as data relating to kinematic states as computed using the kinematic model. In some examples, the tracking data 236 includes positional information, such as information on detected joint positions. In some examples, the tracking data 236 includes motion information, such as acceleration data from sensors attached to or in communication with the XR device 110.

The kinematic model data 238 includes, for example, positions of a plurality of joints of the hand as well as angles of hand segments, expressed according to a kinematic model. The kinematic model data 238 can store details of kinematic states of the tracked body part. For example, the kinematic model data 238 can include a kinematic state (e.g., values for the joint positions and joint angles, velocity data, and/or acceleration data) at each of a plurality of time points. This creates a series of kinematic states that assists with object tracking and kinematic state prediction.

In some examples, the kinematic model data 238 stores different kinematic model "templates." For example, different kinematic models might be used for children and adults, each with different parameters and/or motion constraints (e.g., allowable joint angles or joint constraints).

The motion prediction settings 240 include configurations and parameters that govern how future movements of a body part, such as the hand, are predicted by the XR device 110. The motion prediction settings 240 may adjust the sensitivity of motion prediction, define different prediction models or technique, define the temporal resolution for predictions (e.g., predicting movements 250 milliseconds into the future, 500 milliseconds into the future, or 1 second into the future), and set thresholds for activating certain device responses, ensuring that motion prediction is both accurate and responsive to the user's actions.

Predicted state data 242 can include estimated future kinematic state data, such as predicted poses of the hand or parts thereof, as computed via the motion prediction component 222. The predicted state data 242 can be leveraged, for example, by the AR application 224, to determine where and how to generate virtual content, and to instruct the graphical processing unit 228 accordingly.

One or more of the components described herein may be implemented using hardware (e.g., a processor of a machine) or a combination of hardware and software. For example, a component described herein may configure a processor to perform the operations described herein for that component. Moreover, two or more of these components may be combined into a single component, and the functions described herein for a single component may be subdivided among multiple components. Furthermore, according to various examples, components described herein as being implemented within a single machine, database, component, or device may be distributed across multiple machines, databases, components, or devices.

It is possible to generate a kinematic model of a hand. For example, finger bones and joints are modeled as a "skeleton" with rotational joints that can each rotate in one or more directions.

Figure 3:
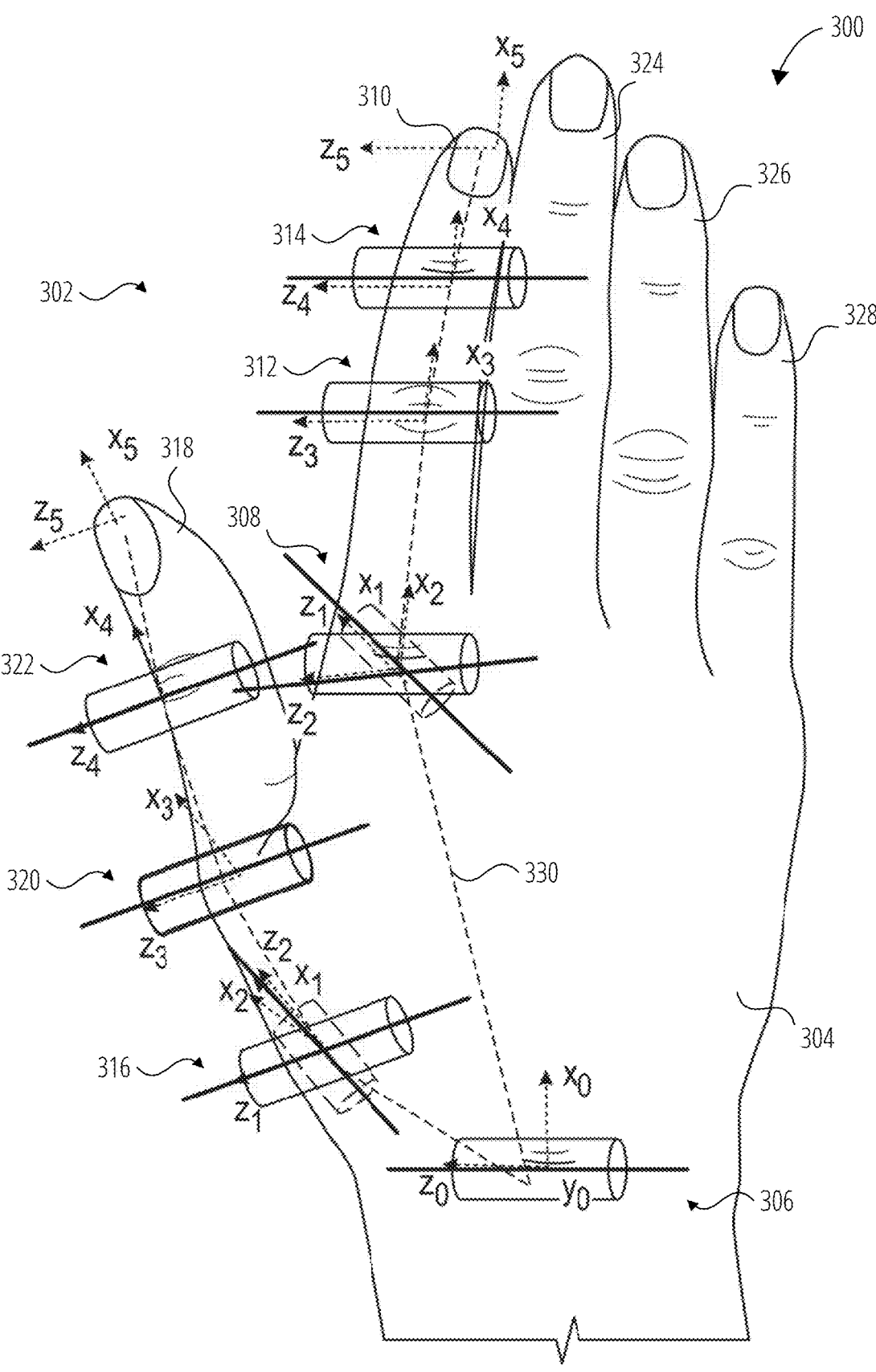
FIG. 3 illustrates a kinematic model of part of a hand, according to some examples.

FIG. 3 is a diagram 300 that illustrates aspects of a kinematic model 302 of a hand 304, according to some examples. In the example of FIG. 3, the kinematic structure of the hand 304 is modeled using kinematic chains with the wrist 306 as the origin of a reference frame (shown at $(x_0, y_0, z_0)$). In other words, a base point at the wrist 306 can be defined as an origin point for the movement of the hand 304. In some examples, the XR device 110 determines the position of the origin point within the real-world environment 102 and can then obtain other hand joint positions based on the relations discussed below.

Each joint in the kinematic model 302 is modeled on the basis of one or more degrees of freedom (DoF) associated with it. For example, the metacarpophalangeal joint 308 of the index finger 310 shown in FIG. 3 is a 2-DoF joint, so it is modeled using an ellipsoidal joint with perpendicular rotational axes that enable flexion/extension as well as limited lateral deviation, as illustrated by the elements depicted in FIG. 3. Since the proximal interphalangeal joint

312 and the distal interphalangeal joint 314 of the index finger are joints with a single degree of freedom, they are each modeled with hinge joints enabling movement only in one rotational direction, as also shown in FIG. 3.

The trapeziometacarpal joint 316 of the thumb 318 is also a 2-DoF joint, modeled using an ellipsoidal joint with perpendicular rotational axes, while the metacarpophalangeal joint 320 and the interphalangeal joint 322 of the thumb 318 are modeled as hinge joints with a single degree of freedom each. In other words, the base bone of the thumb 318 has two rotational degrees of freedom, while the upper joint of the thumb 318 can only bend along one rotational direction.

For the sake of clarity, only the kinematic chains of the thumb 318 and the index finger 310 are shown in FIG. 3. In some examples, the kinematic model 302 can also include the kinematic chains of the middle finger 324, ring finger 326, and/or pinky finger 328. They can each have the same or a similar kinematic chain as the index finger.

The bones between the relevant joints of the kinematic model 302 are regarded as rigid segments, or links. The lengths of bones, or links, can be obtained as part of calibration operations performed by the XR device 110, or obtained in real-time, such as by fitting joint position data, as obtained from tracking data of the XR device 110, to the kinematic model 302, and finding the bone lengths via inverse kinematics. For example, the XR device 110 can perform a hand calibration operation on a particular user to estimate the length of the metacarpal bone 330 of the index finger 310, as shown in FIG. 3, or can estimate the length of the metacarpal bone 330 in real-time, during a user session, based on hand landmark positions.

Similarly, using inverse kinematics, it is possible for the XR device 110 to determine the joint angles (e.g., angles between links associated with a joint) that would result in detected or estimated joint positions.

Accordingly, in some examples, the kinematic state can be described by the pose of each joint and/or bone included in the kinematic model 302. For example, the kinematic state at a particular point in time can include the positions of the relevant joints (e.g., relative to the origin point or relative to the XR device 110) as well as joint angles associated with the joints (e.g., the angles between their links).

The kinematic state can thus describe the spatial configuration of the hand at a particular point in time based on the motion constraints defined by the kinematic model 302. In some examples, since the kinematic state includes not only the positions of joints but also the orientations (e.g., rotations) around the joints, the kinematic state can provide a full 6DoF pose of the hand and/or parts thereof. Where these positions and angles are tracked over time, kinematic state data can be updated to include further information, such as the velocities or angular velocities of the joints.

The kinematic model 302 can define various motion constraints. For example, the motion of each finger bone is constrained by the DoF definition of its joint or joints. As an example, a hinge joint typically allows angular movement in one plane (bending and extending), and this constraint is reflected in the kinematic model 302. Other motion constraints can include, for example, that certain motions or angles are assumed to be zero (e.g., an approximation of 0 degrees for the angle of abduction of the middle finger relative to the point of origin at the wrist 306), and certain correlations between joints or joint angles. An example of such a correlation is the assumption that there is a fixed correlation between joint angle of the proximal interphalangeal joint and the joint angle of the distal interphalangeal joint of the same finger (e.g., the joint angle of the distal interphalangeal joint has to be two-thirds of the joint angle of the proximal interphalangeal joint). Another example of a "zero constraint" is that "in-bone-axis" rotation of finger joints are constrained to be zero, or close to zero (e.g., rotation around the x-axis of the proximal interphalangeal joint 312 of FIG. 3 is limited to zero or close to zero.) Motion constraints can ensure that motion predictions adhere to realistic movements and/or serve to simplify such predictions.

In some examples, angular motion constraints are defined in degrees relative to a "zero pose," such as the "flat hand pose" shown in FIG. 3. Table 1 below illustrates examples of such constraints, with reference to joints shown in FIG. 3. In Table 1, "x constraints" are the minimum and maximum bending angles, respectively, for "in-bone-axis" rotation, while "y constraints" are the minimum and maximum abduction (sideways) bending angles, respectively, and the "z constraints" are the minimum and maximum flexion/extension angles.

TABLE 1

| Examples of motion constraints | | | |
|---|---|---|---|
| Joint name | x constraints | y constraints | z constraints |
| 308 | 0/0 | −30/+30 | −20/100 |
| 312 | 0/0 | 0/0 | 0/100 |
| 314 | 0/0 | 0/0 | −10/90 |

Table 1 illustrates examples for an index finger only. Similar constraints can be defined for a middle finger, ring finger, and/or pinky finger.

Accordingly, a kinematic model, such as the kinematic model 302 of FIG. 3 which mathematically represents joints and bones of the hand as interconnected elements with defined ranges of motion and/or motion constraints, enables the XR device 110 to determine and keep track of the kinematic state of the hand. As will be described below with reference to FIGS. 4-7, such a kinematic model can also be used to forecast hand positions based on tracked movement data.

In other words, by computing joint positions and joint angles over time (e.g., for many frames from a camera stream), it is possible for the XR device 110 to estimate velocities, angular velocities, accelerations, or other motion indicators of the joints. In this way, the XR device 110 can track how fast and where the fingers of the hand are moving within a scene, and also predict where (e.g., at which 3D coordinates) and/or how (e.g., into which spatial configuration) they will move in the future. By constraining predictions to realistic movements allowed by the joints (e.g., as defined by the kinematic model and its motion constraints), precision of predictions can be enhanced to obtain results that are realistic and closely aligned with the natural motion of the hand.

Figure 4:
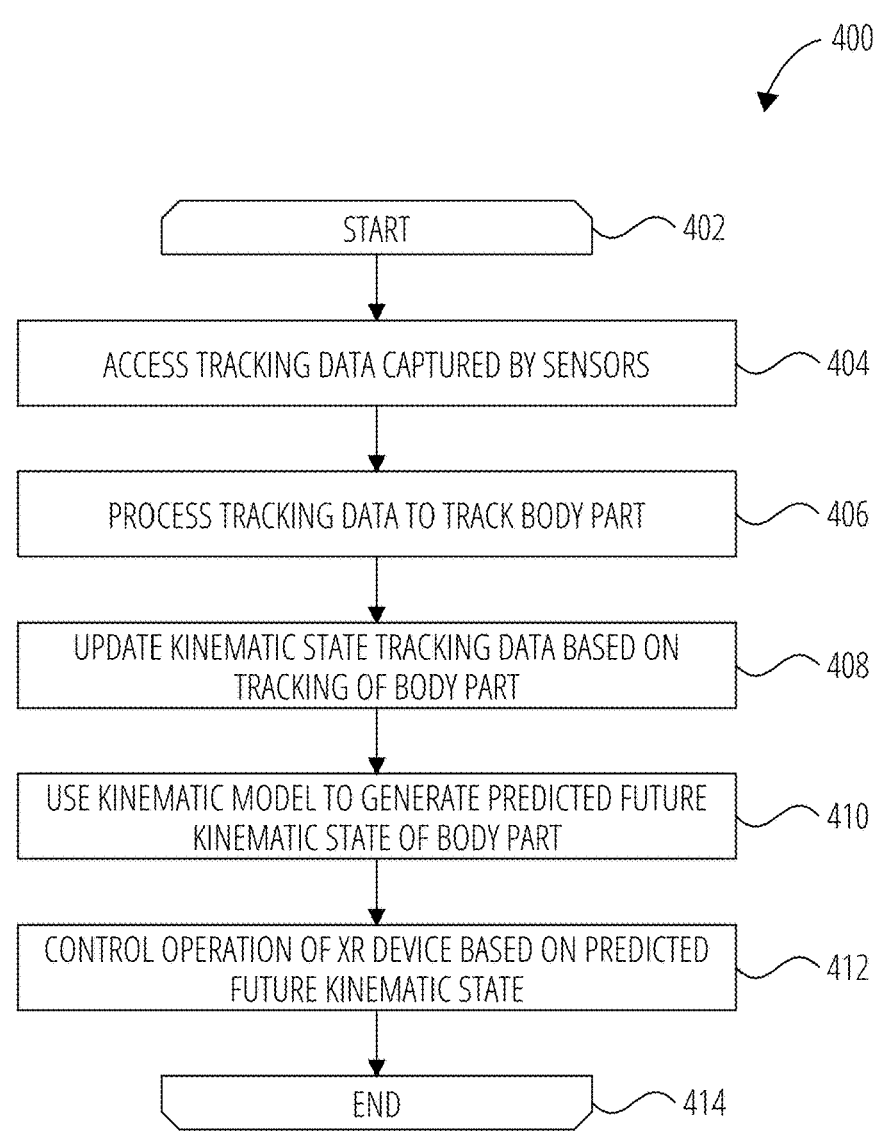
FIG. 4 is a flowchart illustrating operations of a method suitable for using, by an XR device, a kinematic model to predict a future kinematic state of a body part, according to some examples.

FIG. 4 is a flowchart illustrating operations of a method 400 suitable for using a kinematic model to predict a future kinematic state of a body part, according to some examples. By way of example and not limitation, aspects of the method 400 may be performed by components, devices, systems, networks, or databases shown in FIG. 1 and FIG. 2, and they may accordingly be referenced below. Furthermore, by way of example and not limitation, the kinematic model 302 of FIG. 3 is referenced below to illustrate certain aspects of the method 400. It will be appreciated that other components, devices, systems, networks, or databases, and/or other kinematic models, may be used to perform one or more operations of the method 400.

The method 400 commences at opening loop operation 402 and proceeds to operation 404, where the XR device 110 accesses tracking data captured by one or more of the sensors 202. The tracking data captures information about a body part. The hand 304 of FIG. 3 (e.g., a hand of the user of the XR device 110) is used as an example of the body part in the description below.

For example, image sensors 210 in the form of a pair of cameras capture images of the hand 304 in the field of view of the XR device 110. In such cases, the cameras can be spaced a distance apart and simultaneously capture images from slightly different angles, allowing for principles of stereoscopic vision to be applied (e.g., taking 2D positions from the two different "views" and performing triangulation to obtain 3D positions). Tracking data can also be captured in other ways, such as from motion sensors on or near the hand 304.

At operation 406, the XR device 110 processes the tracking data to track the hand 304. In some examples, the XR device 110 determines positions of joints on the hand 304 (e.g., via the object tracking component 220). For example, the object tracking component 220 processes images of the hand 304 using computer vision techniques to perform landmark detection. In other words, in some examples, raw sensor data is processed into more meaningful information that includes the tracked or estimated positions of various joints on the hand 304. In some examples, the XR device 110 executes a hand detection or hand tracking machine learning model. When stereoscopic vision is utilized, feature matching can be applied to identify the positions of landmarks and triangulate their 3D coordinates.

The respective positions of the joints on the hand 304 can be determined across multiple points in time (e.g., across a plurality of video frames). This allows the XR device 110 to track these positions over time.

At operation 408, the XR device 110 updates kinematic state tracking data based on the tracking of the hand 304. The kinematic state tracking data can include the details of one or multiple tracked kinematic states of the hand 304. For example, for a particular set of hand landmarks (e.g., joint positions), the object tracking component 220 uses inverse describe the spatial configuration of the hand 304 based on the positions of the various joints and motion constraints of the kinematic model 302.

In some examples, as the XR device 110 continues to track the hand, kinematic state tracking data is updated by adding the details of further kinematic states thereto. This allows the XR device 110 to track the kinematic state of the hand 304 as it changes over time. The kinematic state tracking data can be dynamically updated by the XR device 110 by computing one or more motion indicators, such as linear velocity of one or more of the plurality of joints (or other parts of the hand 304), angular velocity of one or more of the plurality of joints (or other parts of the hand 304), linear acceleration of one or more of the plurality of joints (or other parts of the hand 304), angular acceleration of one or more of the plurality of joints (or other parts of the hand 304), linear jerk of one or more of the plurality of joints (or other parts of the hand 304), or angular jerk of one or more of the plurality of joints (or other parts of the hand 304). For example, since the XR device 110 has historic kinematic state data indicating how the joints and joint angles of the index finger have changed over time, the XR device 110 can compute the linear velocity, angular velocity, linear acceleration, and/or angular acceleration of its joints and/or segments (e.g., a finger tip of the index finger).

At operation 410, the motion prediction component 222 of the XR device 110 uses the kinematic model and the kinematic state tracking data to generate a predicted future kinematic state of the hand 304, or part thereof. For example, based on the linear velocity, angular velocity, linear acceleration, and/or angular acceleration of various joints and/or segments, the XR device 110 predicts the positioning, orientation, and/or spatial configuration of the hand at a future point in time (e.g., 50 ms, 250 ms, 500 ms, or 1 second in the future). In some examples, the prediction is generated by the XR device 110 by using the motion information obtained from tracking the kinematic state as well as motion constraints of the kinematic model 302.

Merely as an example, a prediction with respect to one angle of the distal interphalangeal joint 314 of the index finger of FIG. 3 is illustrated below, where $\Phi(t)$ is the angle around the z-axis at time t and prediction_time is the time difference between the last measurement and the time being predicted for:

--- measured tracking data:
$\Phi(100 \text{ ms}) = 10°$
$\Phi(133 \text{ ms}) = 15°$
$\Phi(166 \text{ ms}) = 20°$
$\Phi(200 \text{ ms})$: compute predicted value
compute prediction at time 200 ms:
angular_velocity = $(\Phi(166 \text{ ms}) - \Phi(133 \text{ ms})) / \text{delta\_time} = (20° - 15°) / (166 \text{ ms} - 133 \text{ ms})$
= 151.5°/s
$\Phi(200 \text{ ms}) = \Phi(166 \text{ ms}) + \text{angular\_velocity} * \text{prediction\_time}$
= $20° + 151.5°/s * (200 \text{ ms} - 166 \text{ ms}) = 25.15°$

--- kinematics to fit the hand landmarks to the kinematic model 302 of the hand 304, and thereby to obtain other values, such as various joint angles. In some examples, during an inverse kinematics process, the XR device 110 automatically determines the joint angles (and, where relevant, bone lengths) that would result in the detected joint positions within the constraints of the kinematic model 302.

In this way, the XR device 110 obtains or estimates the kinematic state of the hand 304 at the point in time associated with the particular set of hand landmarks being analyzed. As discussed elsewhere, the kinematic state can Such predictions can be computed for various joints and for angles around various axes. Furthermore, it is noted that the aforementioned technique is a non-limiting example. Alternative techniques, such as a double exponential filter for quaternions and continuous time values, can be employed to predict future kinematic state values.

The predicted future kinematic state can include a 6DoF pose of the hand, or part thereof. In some examples, the predicted future kinematic state can be expressed in relation to the real-world environment 102. For example, the XR device 110 predicts the future position of the wrist 306, and since the relative positions and orientations of other parts of the hand 304 are known relative to the wrist 306, the predicted future position and/or orientations can be expressed in relation to the real-world environment 102.

The utilization of the kinematic model 302 for motion prediction can enhance the accuracy of predictions. For example, it might be possible to individually track points on the hand, without reference to a kinematic model, and calculate their velocities to predict their future positions. However, this approach might only provide a basic level of prediction, and is susceptible to errors due to the independent movement of each point, which can lead to inconsistencies and inaccuracies in the predicted positions of the hand and fingers. For example, this approach can lead to unrealistic predictions, with respective joints being predicted to be in positions that are not possible or feasible due to motion constraints that exist between them.

In some examples, leveraging a kinematic model ensures that the prediction is made "in the kinematic model space," which requires links to follow specific motions around defined rotational axes. This approach can not only reduce the complexity of the calculations but can also enhance the precision of the predictions. Movements of the hand are predicted within the constraints of natural human motion, making the predictions more reliable and realistic. By providing a more constrained and less error-prone technique, the functionality of the XR device 110 can be improved.

The method 400 proceeds to operation 412, where the control system 226 of the XR device 110 controls operation of the XR device 110 based on the predicted future kinematic state. For example, based on a predicted trajectory of the index finger 310 of the hand 304, the XR device 110 identifies that the user is likely to "press" a virtual button at the future point in time. The XR device 110 then reacts to the virtual button "press" at the appropriate time, reducing latency between a user action and a corresponding device action.

Various control operations can be performed by the XR device 110. Control operations may include selecting or adapting user interface elements, triggering XR experiences, or changing virtual content presented to the user. The XR device can adjust virtual content or other aspects of an XR experience in real-time based on predicted hand movements or positions. The method 400 concludes at closing loop operation 414.

It is noted that, in some examples, the XR device 110 repeats at least some operations of the method 400. For example, the XR device 110 can continuously compute joint positions and angles over time and update the kinematic state of the hand 304 as it moves in the real-world environment 102. The XR device 110 can then make multiple predictions as to future hand movements and/or poses at various points in time, and control the user's XR experience accordingly.

FIG. 5 is a flowchart illustrating operations of a method 500 suitable for using kinematic state tracking data to synchronize a device action performed by an XR device with a predicted user action of a user of the XR device, according to some examples. By way of example and not limitation, aspects of the method 500 may be performed by components, devices, systems, networks, or databases shown in FIG. 1 and FIG. 2, and they may accordingly be referenced below. Furthermore, by way of example and not limitation, the kinematic model 302 of FIG. 3 is referenced below to illustrate certain aspects of the method 500. It will be appreciated that other components, devices, systems, networks, or databases, and/or other kinematic models, may be used to perform one or more operations of the method 500.

The method 500 commences at opening loop operation 502 and proceeds to operation 504, where the XR device 110 accesses kinematic state tracking data. For example, the XR device 110 accesses kinematic state tracking data associated with the hand 304. As discussed elsewhere, the kinematic state tracking data can include various details, such as positions, orientations, velocities, and/or angular velocities of joints (or other parts), determined or estimated from landmarks and their movement over time within the bounds of the kinematic model 302.

At operation 506, at a first point in time, the motion prediction component 222 of the XR device 110 generates a predicted future kinematic state associated with the hand 304 at a second point in time. For example, the motion prediction component 222 uses the kinematic model 302 and the kinematic state tracking data to extrapolate motion trends, within the motion constraints defined by the kinematic model 302, into the future, to determine where the hand 304 will be, and how it will be configured or orientation, at the second point in time.

The XR device 110 (e.g., using the control system 226) identifies, at operation 508, a predicted user action that is estimated to occur at the second point in time. A predicted user action may include an anticipated physical movement, position, and/or orientation of a body part, such as a hand or finger, that is expected to occur at a future point in time based on kinematic state tracking data. For example, based on a predicted trajectory of the index finger 310 of the hand 304, the XR device 110 identifies that the user is likely to "press" a virtual button that is being displayed via the AR application 224 and the display arrangement 206 at the future point in time.

At operation 510, the XR device 110 (e.g., using the control system 226) determines a device action that corresponds to the predicted user action. A device action may include a response or operation performed by the XR device 110 in anticipation of, or in response to, a predicted user action. For instance, a device action might involve rendering virtual content that aligns with the predicted position of the hand 304 at the moment the hand 304 reaches that position.

The XR device 110 then synchronizes the device action with occurrence of predicted user action at operation 512, and triggers the device action at operation 514. For example, the control system 226 and the AR application 224 communicate with the graphical processing unit 228 to ensure that virtual content is rendered and presented to the user at the second point in time, or shortly thereafter, in a manner that is coherent with the user's action (e.g., button "press"). This creates the impression that the user is directly manipulating virtual content in a smooth manner. The method 500 concludes at closing loop operation 516.

Using methods such as the method 500 of FIG. 5, inherent latency issues associated with hand tracking technologies can be addressed or alleviated. Traditional XR systems experience delays as the XR device captures hand movements through cameras, processes 3D landmarks, and computes the hand's pose. These delays can disrupt the user experience, making interactions with virtual environments feel unnatural and sluggish.

By employing predictive modeling based on kinematic state tracking data, an XR device can forecast the future movements and poses, enabling the XR device to anticipate user actions, such as pressing of a virtual button, and synchronize responses accordingly. For instance, if the XR device predicts that a user's finger will touch a virtual surface in 250 ms, it can prepare the virtual response to coincide precisely with that action. This synchronization can reduce the perceived delay, enhancing the responsiveness and fluidity of the user's interactions XR environment.

Figure 6:
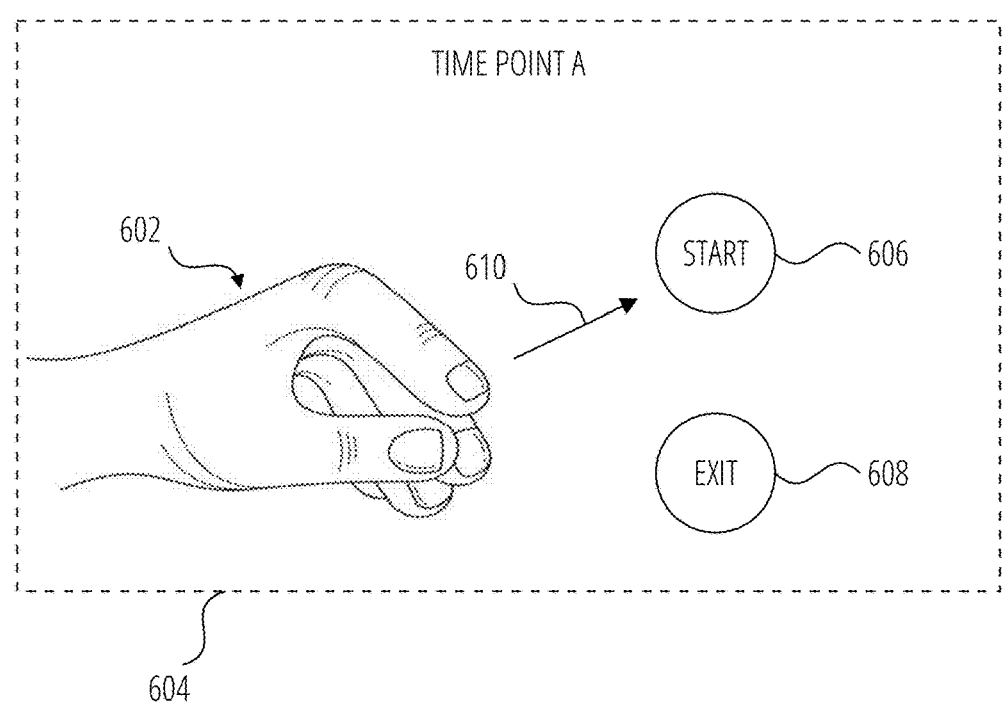
FIG. 6 illustrates a hand of a user of an XR device together with virtual content presented to the user within a field of view, according to some examples, wherein the hand is shown at a first point in time.
Figure 7:
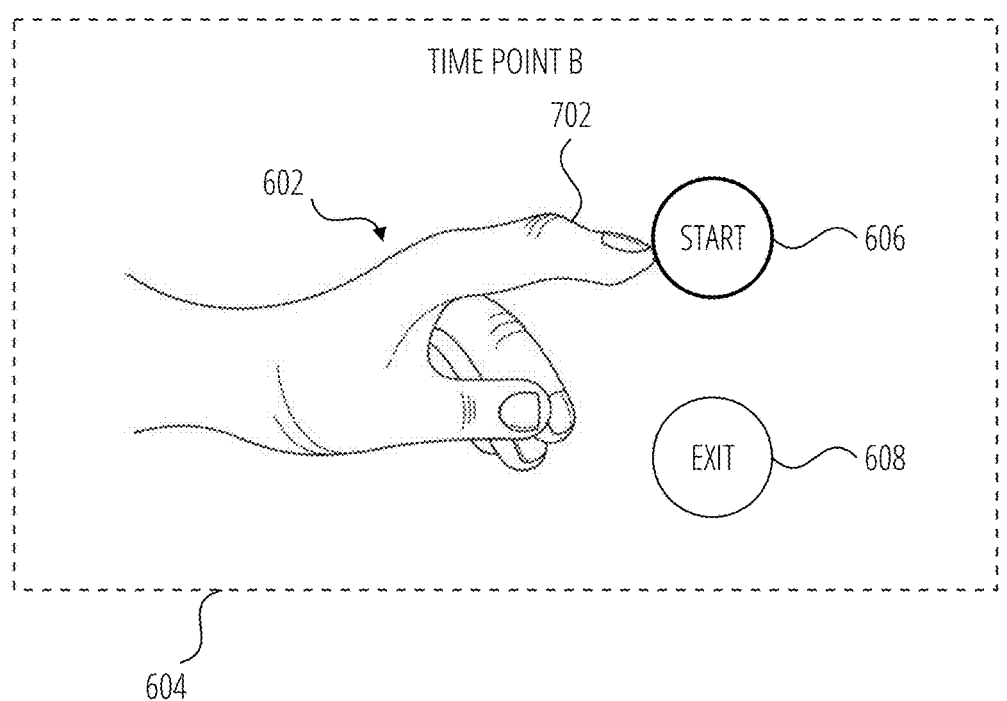
FIG. 7 illustrates the hand and virtual content of FIG. 6, according to some examples, wherein the hand is shown to be engaging with the virtual content at a second point in time.

FIG. 6 and FIG. 7 illustrate a hand 602 of a user of the XR device 110 together with virtual content presented to the user within a field of view 604, according to some examples. FIG. 6 shows the hand 602 at a first point in time ("time point A") and FIG. 7 shows the hand 602 at a second point in time ("time point B").

The virtual content includes a virtual button 606 and a virtual button 608 that are presented to augment the user's experience of reality (e.g., the real-world environment 102 of FIG. 1). The virtual button 606 is labeled "START" and the virtual button 608 is labeled "EXIT." The XR device 110 uses hand gestures or movements as input. For example, the virtual button 606 can be selected through engagement with the hand 602 to trigger the start of a new virtual game session, while the virtual button 608 can be selected through engagement with the hand 602 to leave an options menu of the virtual game.

As indicated by the directional arrow 610 in FIG. 6, the user moves the hand 602 towards the virtual button 606. While the hand 602 moves, the XR device 110 continuously tracks and updates its kinematic state, based on a defined kinematic model of the hand 602, as discussed elsewhere in the present disclosure. This enables the XR device 110 to predict where the hand 602 will be at the second point in time.

In the examples of FIG. 6 and FIG. 7, while the hand 602 moves towards the virtual button 606, the user also stretches out the index finger 702 of the hand 602 (see FIG. 7). From the perspective of the user, as soon as the index finger 702 engages with the virtual button 606, the user may expect the virtual button 606 to become "pressed," or to see some form of a response from the XR device 110 indicating that the user action has been registered.

Before the second point in time, the XR device 110 generates a predicted future kinematic state that indicates that the tip of the index finger 702 is estimated to be at a certain position and/or orientation at the second point in time. Based on the positioning of the virtual button 606 and the predicted future kinematic state, the XR device 110 estimates that the tip of the index finger 702 will engage with the virtual button 606 at the second point in time. In response, the XR device 110 triggers a suitable device action, such as starting a new virtual game session, at or near the second point in time. For example, the XR device 110 causes the virtual content presented to the user to change at (or very soon after) the second point in time to highlight the virtual button 606, as shown in FIG. 7, and then to launch the game session. In some examples, this makes the XR experience feel more responsive, creating a smoother, immersive experience that closely mirrors real-world interactions.

Accordingly, the XR device 110 can use the kinematic model of the hand 602 to anticipate where it will be at a future point in time, before the hand reaches that position. This predictive capability is facilitated by continuously updating kinematic state tracking data using the kinematic model and data from sensors that track the hand's position and movement.

The examples of FIG. 6 and FIG. 7 relate to engagement with a virtual button. As another example, the XR device 110 might predict that the user will perform or complete a specific hand gesture, such as using an index finger to tap on the palm of a hand. To ensure that the XR experience is smooth and responsive, the XR device 110 triggers the relevant device action at the moment when the index finger engages with the palm. To overcome the delay in processing hand tracking data and generating virtual content (assuming, for example, a delay of about 100 ms), the XR device 110 predicts, in advance, that the gesture will be completed in (e.g., 100 ms before it is actually completed), and then initiates the device action at the appropriate moment. As a result, the user perceives no noticeable delay between the touching of their palm and the device action that occurs in response to the touching of the palm.

In some examples, predicted future kinematic states can be used to adjust sensor modes of the XR device 110, thereby reducing the power consumption associated with those sensors or otherwise improving the efficiency of resource usage by the XR device 110. Cameras are examples of such sensors, and are discussed below with reference to FIG. 8.

Figure 8:
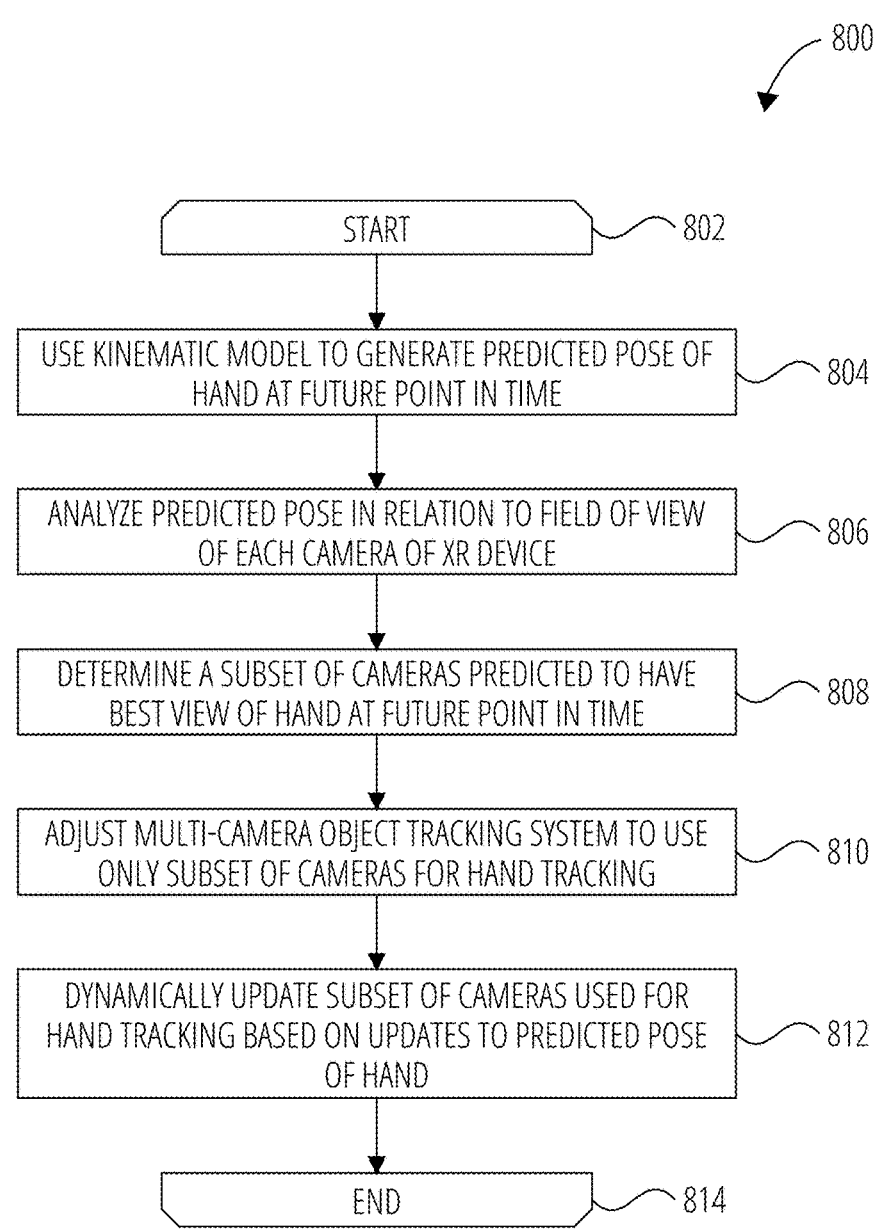
FIG. 8 is a flowchart illustrating operations of a method suitable for using, by an XR device, a kinematic model to predict a pose of a hand, and to dynamically adjust a multi-camera object tracking system of the XR device based on the predicted pose of the hand, according to some examples.

FIG. 8 is a flowchart illustrating operations of a method 800 suitable for using a kinematic model to predict a pose of a hand, and to dynamically adjust a multi-camera object tracking system of the XR device 110 based on the predicted pose of the hand. By way of example and not limitation, aspects of the method 800 may be performed by components, devices, systems, networks, or databases shown in FIG. 1 and FIG. 2, and they may accordingly be referenced below. Furthermore, by way of example and not limitation, the kinematic model 302 of FIG. 3 is referenced below to illustrate certain aspects of the method 800. It will be appreciated that other components, devices, systems, networks, or databases, and/or other kinematic models, may be used to perform one or more operations of the method 800.

As mentioned, in some examples, the XR device 110 includes a multi-camera object tracking system. For instance, the image sensors 210 can include a top left camera, a top right camera, a bottom left camera, and a bottom right camera (when viewed from the front of the XR device 110). These cameras are spaced apart and capture different, but typically overlapping, fields of view.

The multi-camera object tracking system can identify and track the location, movement, or orientation of an object in 3D space. The multi-camera object tracking system may include, or communicate synergistically with, a SLAM system of the XR device 110, for example, in the creation of a model of a real-world environment to improve object tracking performance.

Using multiple cameras has advantages, such as allowing for tracking from multiple angles, extending the overall field of view of the system, helping to overcome occlusions, and providing more robust and reliable tracking results. However, capturing, processing, and merging image data from multiple cameras can be computationally intensive, requiring significant processing power and storage. It may thus be desirable to select only a subset of the cameras to perform image capturing, hand detection, and/or tracking.

The method 800 commences at opening loop operation 802 and proceeds to operation 804, where the XR device 110 uses the kinematic model 302 of the hand 304 to generate a predicted pose of the hand 304. The predicted pose is associated with a future point in time, and can be determined by the motion prediction component 222 using techniques as described, for example, with reference to FIG. 4 or FIG. 5.

At operation 806, the control system 226 of the XR device 110 analyzes the predicted pose in relation to the respective field of view (e.g., field capturable by) each camera in the multi-camera object tracking system. For example, based on the predicted future kinematic state, the control system 226 determines where in the field of view of each camera the hand 304, or part thereof, is estimated to appear, or determines which parts of the hand 304 will be visible in the field of the view of each respective camera.

The control system 226 then, at operation 808, determines a subset of cameras predicted to have the best view of the hand 304 at the future point in time. Various criteria can be used to determine which camera or cameras will have the "best" view of the hand 304. As a first example, the control system 226 can determine a camera (or cameras) that will "most centrally" capture the hand 304, based on the predicted future kinematic state thereof. In other words, the control system 226 determines which camera is likely to have the hand 304 located closest to the center of its field of view, based on the predicted future kinematic state.

As a second example, the control system 226 can determine a camera (or cameras) that will have the least occluded view of the fingers of the hand 304. For example, one camera is predicted to capture the hand 304 such that all fingers are visible, while another camera is predicted to capture the hand 304 such that one or more fingers are occluded by other parts of the hand, or other objects.

As a third example, the control system 226 can determine a camera (or cameras) that will have the clearest view of a particular subset of fingers. For instance, where the XR device 110 monitors the hand 304 in order to detect a pinch gesture that is performed using the thumb and index finger only, the control system 226 identifies a camera (or cameras) estimated to have a clear or unobstructed view of the thumb and index finger at the future point in time.

Once the XR device 110 has determined the subset of cameras in operation 808, the subset is selected, and the multi-camera object tracking system is adjusted accordingly by the XR device 110 at operation 810. For example, only a subset of the cameras are selected to be used for hand tracking during an upcoming period of a user session.

In this context, "selection" of a camera or subset of cameras may have different effects, depending on the implementation. For example, if a camera is selected, it may be used for sampling (e.g., processing of a frame recorded or captured by that camera) at a given point in time or in a given phase, while a camera that is not selected is not used for sampling at that point in time or in that phase. The camera that is not used for sampling may then be placed in an idle mode or even deactivated (e.g., switched off), in some examples, to reduce power consumption. Alternatively, if a camera is selected, its sampling frequency may be adjusted relative to a camera that is not selected, or a sampling sequence associated with the camera may be defined or adjusted relative to one or more other cameras.

In some examples, and as shown in FIG. 8, the method 800 can include (at operation 812) dynamically updating the selected subset of cameras that is used for hand tracking. For example, the XR device 110 can continuously update the kinematic state tracking data, as described elsewhere, and update the predicted pose of the hand 304 as it changes over time. As a result, the control system 226 might modify the selected subset of cameras (e.g., due to a camera that was previously not selected becoming better positioned for the tracking of the hand as the hand moves). In other words, the XR device 110 can adjust sensor modes dynamically such that, at a first point in time, a first subset of the cameras is selected to detect or track the hand 304, and at a second point in time, a second subset of the cameras is selected to detect or track the hand 304. The method 800 concludes at closing loop operation 814.

When only a subset of the cameras is selected as described above, the XR device 110 may be said to be in a "low-power mode." Power consumption can be reduced by implementing the low-power mode. In this way, technical problems of improving battery life or freeing up processing resources, or both, can be addressed or alleviated.

Figure 9:
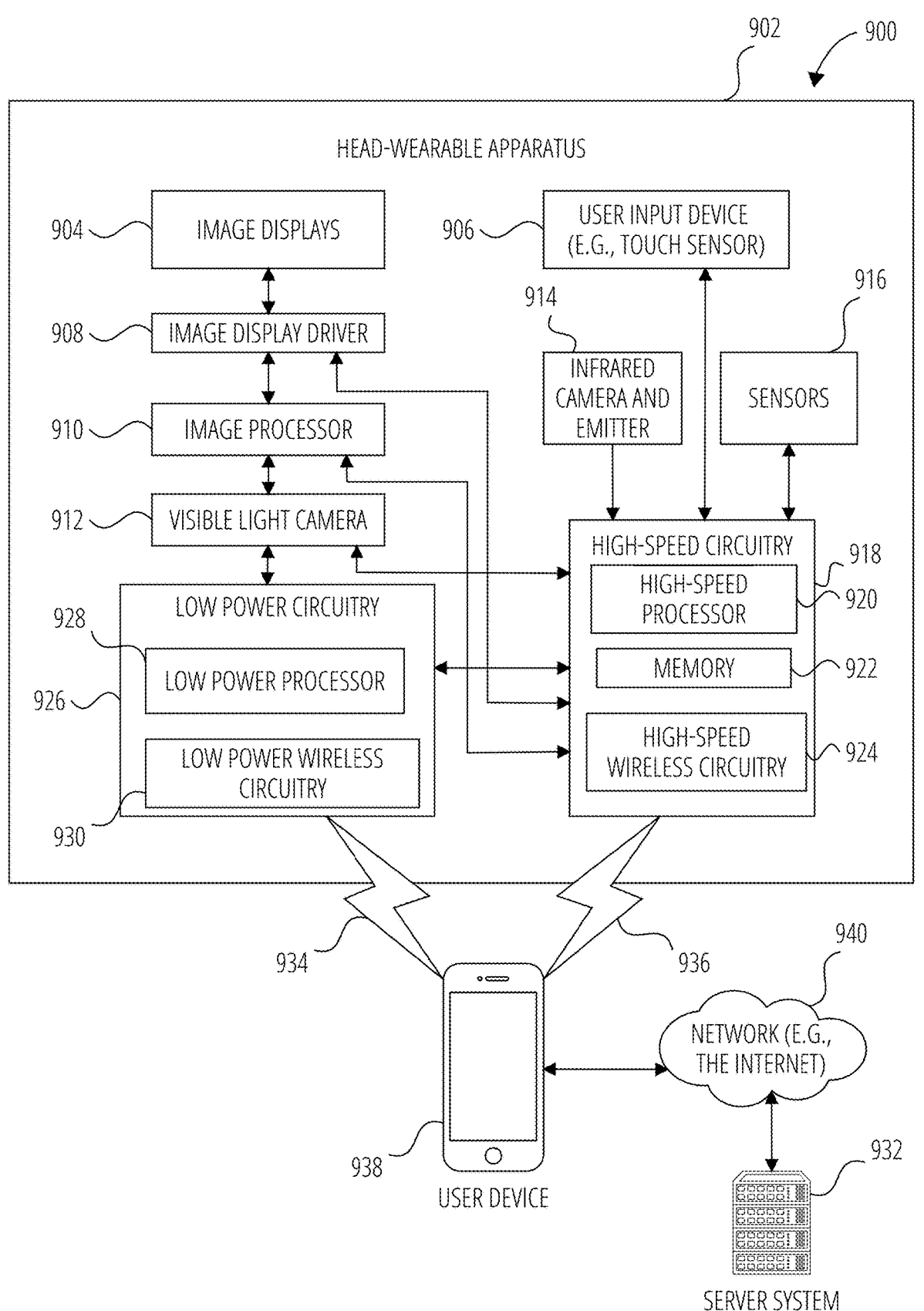
FIG. 9 illustrates a network environment in which a head-wearable apparatus can be implemented, according to some examples.

FIG. 9 illustrates a network environment 900 in which a head-wearable apparatus 902, such as a head-wearable XR device, can be implemented according to some examples. FIG. 9 provides a high-level functional block diagram of an example head-wearable apparatus 902 communicatively coupled a mobile user device 938 and a server system 932 via a suitable network 940. One or more of the techniques described herein may be performed using the head-wearable apparatus 902 or a network of devices similar to those shown in FIG. 9.

The head-wearable apparatus 902 includes a camera, such as at least one of a visible light camera 912 and an infrared camera and emitter 914. The head-wearable apparatus 902 includes other sensors 916, such as motion sensors or eye tracking sensors. The user device 938 can be capable of connecting with head-wearable apparatus 902 using both a communication link 934 and a communication link 936. The user device 938 is connected to the server system 932 via the network 940. The network 940 may include any combination of wired and wireless connections.

The head-wearable apparatus 902 includes a display arrangement that has several components. For example, the arrangement includes two image displays 904 of an optical assembly. The two displays include one associated with the left lateral side and one associated with the right lateral side of the head-wearable apparatus 902. The head-wearable apparatus 902 also includes an image display driver 908, an image processor 910, low power circuitry 926, and high-speed circuitry 918. The image displays 904 are for presenting images and videos, including an image that can provide a graphical user interface to a user of the head-wearable apparatus 902.

The image display driver 908 commands and controls the image display of each of the image displays 904. The image display driver 908 may deliver image data directly to each image display of the image displays 904 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 902 may include a frame and stems (or temples) extending from a lateral side of the frame, or another component to facilitate wearing of the head-wearable apparatus 902 by a user. The head-wearable apparatus 902 of FIG. 9 further includes a user input device 906 (e.g., touch sensor or push button) including an input surface on the head-wearable apparatus 902. The user input device 906 is configured to receive, from the user, an input selection to manipulate the graphical user interface of the presented image.

The components shown in FIG. 9 for the head-wearable apparatus 902 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 902. Left and right sides of the head-wearable apparatus 902 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. The memory 922 can also include a storage device. As further shown in FIG. 9, the high-speed circuitry 918 includes a high-speed processor 920, the memory 922, and high-speed wireless circuitry 924. In FIG. 9, the image display driver 908 is coupled to the high-speed circuitry 918 and operated by the high-speed processor 920 in order to drive the left and right image displays of the image displays 904. The high-speed processor 920 may be any processor capable of managing high-speed communications and operation of any general computing system needed for the head-wearable apparatus 902. The high-speed processor 920 includes processing resources needed for managing high-speed data transfers over the communication link 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi™. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or Wi-Fi™). The user device 938, including the transceivers communicating via the communication link 934 and communication link 936, may be implemented using details of the architecture of the head-wearable apparatus 902, as can other elements of the network 940.

The memory 922 includes any storage device capable of storing various data and applications, including, among other things, camera data generated by the visible light camera 912, sensors 916, and the image processor 910, as well as images generated for display by the image display driver 908 on the image displays of the image displays 904. While the memory 922 is shown as integrated with the high-speed circuitry 918, in other examples, the memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (visible light camera 912, or infrared camera and emitter 914), the image display driver 908, the user input device 906 (e.g., touch sensor or push button), and the memory 922. The head-wearable apparatus 902 also includes sensors 916, which may be the motion components 1134, position components 1138, environmental components 1136, and biometric components 1132, e.g., as described below with reference to FIG. 11. In particular, motion components 1134 and position components 1138 are used by the head-wearable apparatus 902 to determine and keep track of the position and orientation (the "pose") of the head-wearable apparatus 902 relative to a frame of reference or another object, in conjunction with a video feed from one of the visible light cameras 912, using for example techniques such as structure from motion (SfM) or VIO.

In some examples, and as shown in FIG. 9, the head-wearable apparatus 902 is connected with a host computer. For example, the head-wearable apparatus 902 is paired with the user device 938 via the communication link 936 or connected to the server system 932 via the network 940. The server system 932 may be one or more computing devices as part of a service or network computing system, for example, that include a processor, a memory, and network communication interface to communicate over the network 940 with the user device 938 and head-wearable apparatus 902.

The user device 938 includes a processor and a network communication interface coupled to the processor. The network communication interface allows for communication over the network 940, communication link 934 or communication link 936. The user device 938 can further store at least portions of the instructions for implementing functionality described herein.

Output components of the head-wearable apparatus 902 include visual components, such as a display (e.g., one or more liquid-crystal display (LCD)), one or more plasma display panel (PDP), one or more light emitting diode (LED) display, one or more projector, or one or more waveguide. The image displays 904 of the optical assembly are driven by the image display driver 908. The output components of the head-wearable apparatus 902 further include acoustic components (e.g., speakers), haptic components (e.g., a vibratory motor), other signal generators, and so forth. The input components of the head-wearable apparatus 902, the user device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with the head-wearable apparatus 902. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 936 from the user device 938 via the low power wireless circuitry 930 or high-speed wireless circuitry 924.

Any biometric data collected by biometric components is captured and stored only with user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Figure 10:
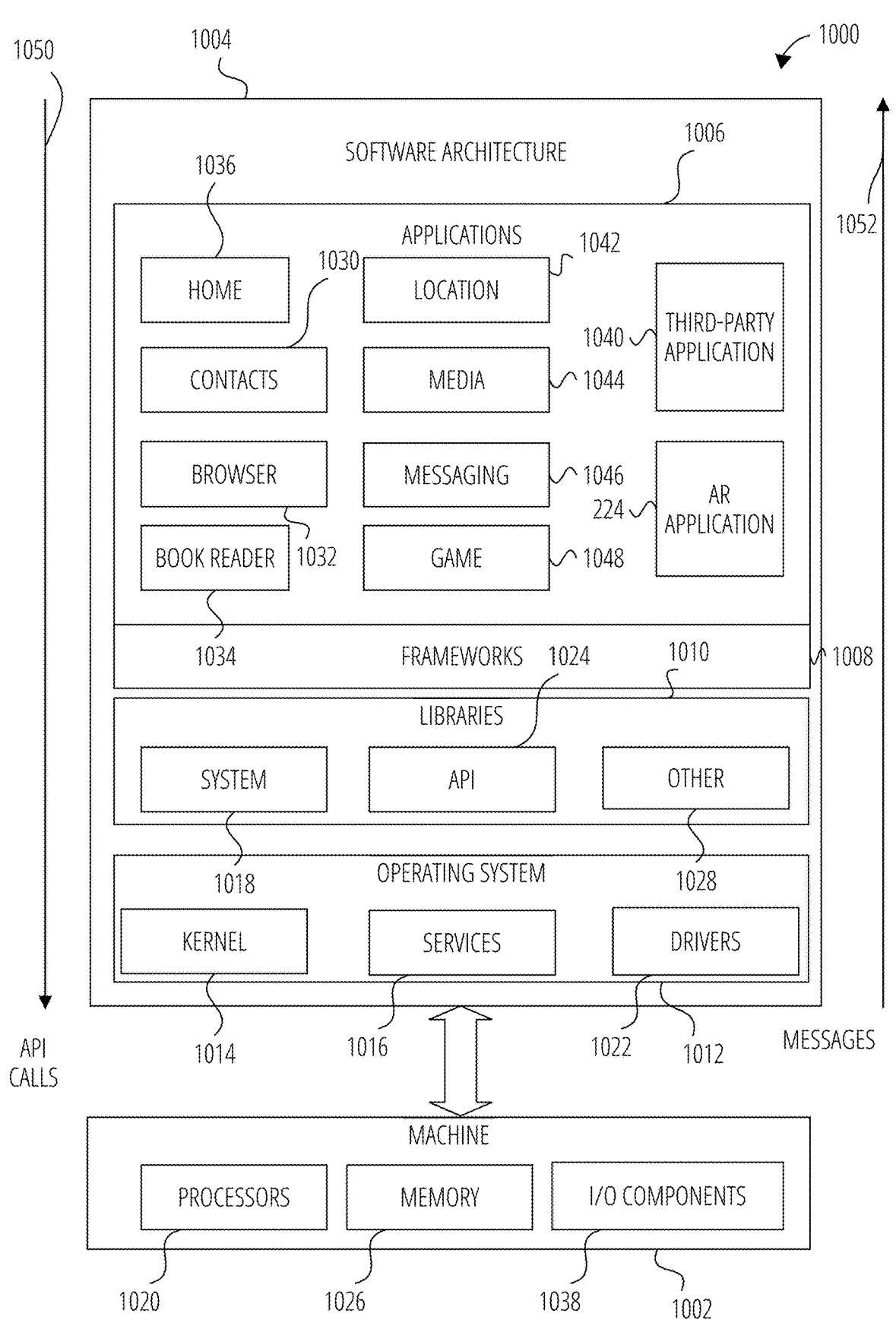
FIG. 10 is a block diagram showing a software architecture within which the present disclosure may be implemented, according to some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke Application Programming Interface calls, API calls 1050, through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In some examples, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In some examples, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 10, the third-party application 1040 can invoke the API calls 1050 provided by the operating system 1012 to facilitate functionality described herein. The applications 1006 may include an AR application such as the AR application 224 described herein, according to some examples.

Figure 11:
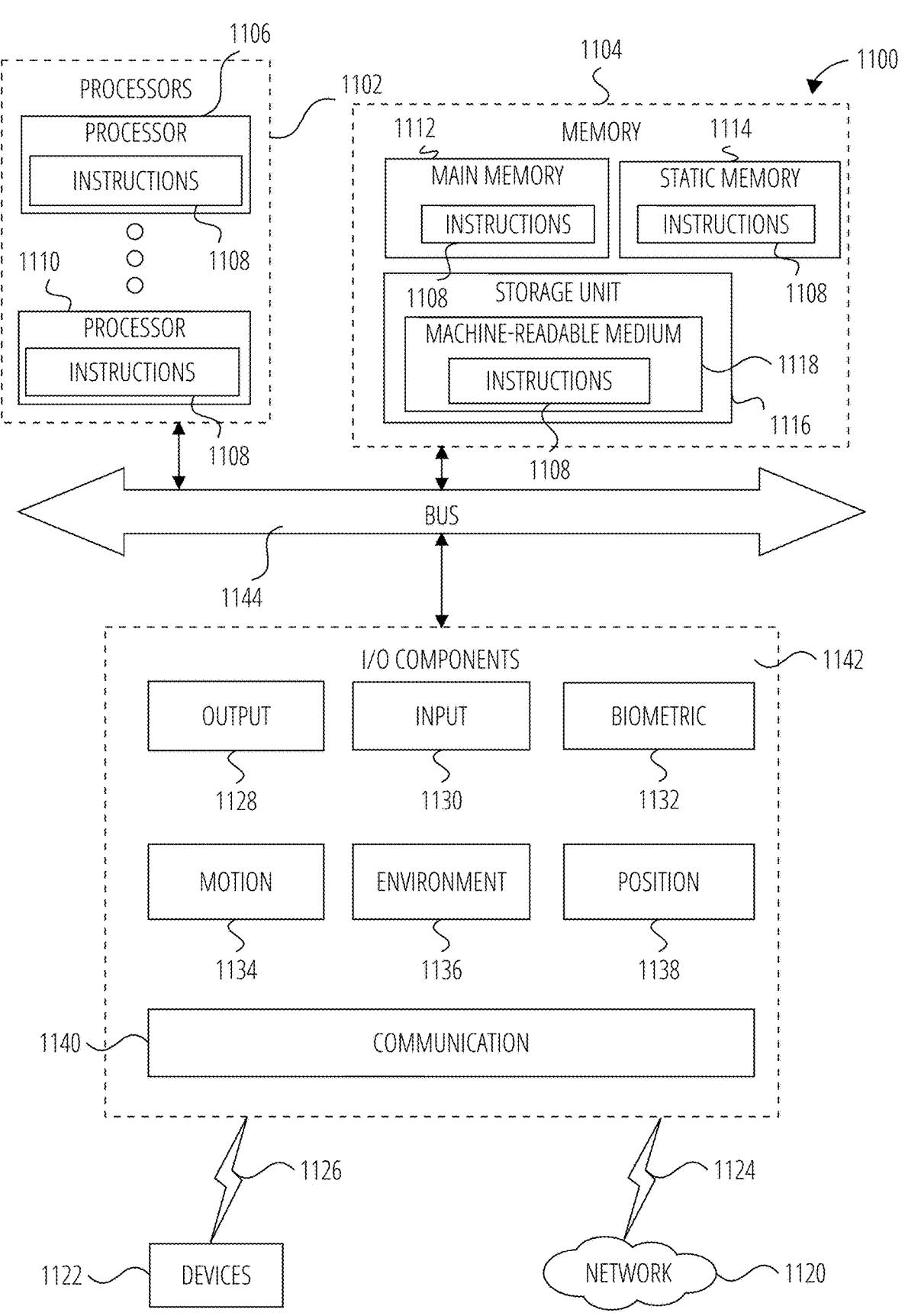
FIG. 11 is a diagrammatic representation of a machine in the form of a computer system within which a set of instructions may be executed for causing the machine to perform any one or more of the methodologies discussed herein, according to some examples.

FIG. 11 is a diagrammatic representation of a machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1142, which may be configured to communicate with each other via a bus 1144. In some examples, the processors 1102 may include, for example, a processor 1106 and a processor 1110 that execute the instructions 1108. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, accessible to the processors via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors, or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones may include a touch input device or other such input mechanisms, while a headless server machine will likely not include such a touch input device. It will be appreciated that the I/O components 1142 may include many other components that are not shown in FIG. 11. In various examples, the I/O components 1142 may include output components 1128 and input components 1130. The output components 1128 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1142 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by biometric components is captured and stored only with user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1142 further include communication components 1140 operable to couple the machine 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth™ components, Wi-Fi™ components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi™ signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus, the following claims are hereby incorporated into the Detailed Description.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method performed by an XR device, the method comprising: accessing tracking data captured via one or more sensors associated with the XR device; processing the tracking data to track at least one body part; dynamically updating kinematic state tracking data based on the tracking of the at least one body part and a kinematic model of the at least one body part; using the kinematic model and the kinematic state tracking data to generate a predicted future kinematic state of the at least one body part; and controlling operation of the XR device based on the predicted future kinematic state.

In Example 2, the subject matter of Example 1 includes, wherein the XR device is a head-wearable XR device, and the at least one body part comprises at least part of a hand of a user of the XR device.

In Example 3, the subject matter of any of Examples 1 and 2 includes, wherein the tracking data is processed to track positions of a plurality of landmarks comprising a plurality of joints of the hand, and the kinematic model is used to describe joint positions and joint angles.

In Example 4, the subject matter of any of Examples 1-3 includes, wherein dynamically updating the kinematic state tracking data comprises tracking, over time, at least one of linear velocity of one or more of the plurality of joints, angular velocity of one or more of the plurality of joints, linear acceleration of one or more of the plurality of joints, angular acceleration of one or more of the plurality of joints, linear jerk of one or more of the plurality of joints, or angular jerk of one or more of the plurality of joints.

In Example 5, the subject matter of any of Examples 1-4 includes, wherein the kinematic state tracking data tracks a kinematic state of the at least one body part over time, and the kinematic state is defined using the kinematic model.

In Example 6, the subject matter of any of Examples 1-5 includes, wherein the predicted future kinematic state is generated based on the kinematic state tracking data and motion constraints defined by the kinematic model.

In Example 7, the subject matter of any of Examples 1-6 includes, wherein the predicted future kinematic state is generated at a first point in time to predict the kinematic state of the at least one body part at a second point in time, and the second point in time is less than 1 second from the first point in time.

In Example 8, the subject matter of any of Examples 1-7 includes, wherein the predicted future kinematic state is generated at a first point in time to predict the kinematic state of the at least one body part at a second point in time, and the second point in time is less than 500 ms from the first point in time.

In Example 9, the subject matter of any of Examples 1-8 includes, wherein the kinematic state comprises a 6DoF pose of the at least one body part in a real-world environment.

In Example 10, the subject matter of any of Examples 1-9 includes, wherein at least some of the kinematic state tracking data is generated or updated, using inverse kinematics, by fitting positions of a plurality of landmarks obtained from the tracking data to the kinematic model.

In Example 11, the subject matter of any of Examples 1-10 includes, wherein controlling the operation of the XR device based on the predicted future kinematic state comprises: identifying, based on the predicted future kinematic state, a predicted user action; determining a device action corresponding to the predicted user action; and synchronizing the device action with occurrence of the predicted user action.

In Example 12, the subject matter of any of Examples 1-11 includes, wherein the predicted user action comprises a user of the XR device performing a detectable gesture.

In Example 13, the subject matter of any of Examples 1-12 includes, wherein the device action comprises a response to the detectable gesture.

In Example 14, the subject matter of any of Examples 1-13 includes, wherein the device action comprises triggering rendering of virtual content for presentation to a user via the XR device.

In Example 15, the subject matter of any of Examples 1-14 includes, wherein the one or more sensors comprise a plurality of sensors, and controlling the operation of the XR device based on the predicted future kinematic state comprises: dynamically selecting, based on the predicted future kinematic state, a subset of the plurality of sensors for tracking of the at least one body part.

In Example 16, the subject matter of any of Example 1-15 includes, wherein the plurality of sensors comprises a plurality of cameras of a multi-camera object tracking system of the XR device, the predicted future kinematic state comprises a predicted pose of the at least one body part, and the subset is dynamically selected based on the predicted pose in relation to a field of view of each respective camera of the plurality of cameras.

In Example 17, the subject matter of any of Examples 1-16 includes, wherein processing of the tracking data comprises executing a machine learning model that is trained to perform object tracking.

In Example 18, the subject matter of any of Examples 1-17 includes, wherein the one or more sensors comprise at least one of: one or more optical sensors of the XR device, one or more depth sensors of the XR device, or one or more motion sensors attached to the at least one body part.

Example 19 is an XR device comprising: at least one processor; and at least one memory storing instructions that, when executed by the at least one processor, cause the XR device to perform operations comprising: accessing tracking data captured via one or more sensors associated with the XR device; processing the tracking data to track at least one body part; dynamically updating kinematic state tracking data based on the tracking of the at least one body part and a kinematic model of the at least one body part; using the kinematic model and the kinematic state tracking data to generate a predicted future kinematic state of the at least one body part; and controlling operation of the XR device based on the predicted future kinematic state.

Example 20 is a non-transitory computer-readable storage medium, the non-transitory computer-readable storage medium including instructions that when executed by at least one processor, cause the at least one processor to perform operations comprising: accessing tracking data captured via one or more sensors associated with an XR device; processing the tracking data to track at least one body part; dynamically updating kinematic state tracking data based on the tracking of the at least one body part and a kinematic model of the at least one body part; using the kinematic model and the kinematic state tracking data to generate a predicted future kinematic state of the at least one body part; and controlling operation of the XR device based on the predicted future kinematic state.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method performed by an extended reality (XR) device, the method comprising:
accessing tracking data captured via one or more sensors of a plurality of sensors associated with the XR device;
processing the tracking data to track at least one body part;

dynamically updating kinematic state tracking data based on the tracking of the at least one body part and a kinematic model of the at least one body part;
using the kinematic model and the kinematic state tracking data to generate a predicted future kinematic state of the at least one body part; and
controlling operation of the XR device based on the predicted future kinematic state by dynamically selecting, based on the predicted future kinematic state, a subset of the plurality of sensors for tracking of the at least one body part,
wherein the plurality of sensors comprises a plurality of cameras of a multi-camera object tracking system of the XR device, and selection of the subset is based on at least one of:
a camera of the plurality of cameras predicted to have the at least one body part closest to a center of a field of view of the camera;
a camera of the plurality of cameras predicted to have a least occluded view of the at least one body part; or
a camera of the plurality of cameras predicted to have a clearest view of a predetermined portion of the at least one body part.

2. The method of claim 1, wherein the XR device is a head-wearable XR device, and the at least one body part comprises at least part of a hand of a user of the XR device.

3. The method of claim 2, wherein the tracking data is processed to track positions of a plurality of landmarks comprising a plurality of joints of the hand, and the kinematic model is applied by the XR device to describe joint positions and joint angles.

4. The method of claim 3, wherein dynamically updating the kinematic state tracking data comprises tracking, over time, at least one of linear velocity of one or more of the plurality of joints, angular velocity of one or more of the plurality of joints, linear acceleration of one or more of the plurality of joints, angular acceleration of one or more of the plurality of joints, linear jerk of one or more of the plurality of joints, or angular jerk of one or more of the plurality of joints.

5. The method of claim 1, wherein the kinematic state tracking data tracks a kinematic state of the at least one body part over time, and the kinematic state is defined using the kinematic model.

6. The method of claim 5, wherein the predicted future kinematic state is generated based on the kinematic state tracking data and motion constraints defined by the kinematic model.

7. The method of claim 5, wherein the predicted future kinematic state is generated at a first point in time to predict the kinematic state of the at least one body part at a second point in time, and the second point in time is less than 1 second from the first point in time.

8. The method of claim 5, wherein the predicted future kinematic state is generated at a first point in time to predict the kinematic state of the at least one body part at a second point in time, and the second point in time is less than 500 ms from the first point in time.

9. The method of claim 5, wherein the kinematic state comprises a six degrees-of-freedom (6DoF) pose of the at least one body part in a real-world environment.

10. The method of claim 1, wherein at least some of the kinematic state tracking data is generated or updated, using inverse kinematics, by fitting positions of a plurality of landmarks obtained from the tracking data to the kinematic model.

11. The method of claim 1, wherein controlling the operation of the XR device based on the predicted future kinematic state further comprises:

identifying, based on the predicted future kinematic state, a predicted user action;

determining a device action corresponding to the predicted user action; and synchronizing the device action with occurrence of the predicted user action.

12. The method of claim 11, wherein the predicted user action comprises a user of the XR device performing a detectable gesture.

13. The method of claim 12, wherein the device action comprises a response to the detectable gesture.

14. The method of claim 11, wherein the device action comprises triggering rendering of virtual content for presentation to a user via the XR device.

15. The method of claim 1, wherein the predicted future kinematic state comprises a predicted pose of the at least one body part, and the subset is further selected based at least partially on the predicted pose in relation to the field of view of each respective camera of the plurality of cameras.

16. The method of claim 1, wherein processing of the tracking data comprises executing a machine learning model that is trained to perform object tracking.

17. An extended reality (XR) device comprising:

at least one processor; and at least one memory storing instructions that, when executed by the at least one processor, cause the XR device to perform operations comprising:

accessing tracking data captured via one or more sensors of a plurality of sensors associated with the XR device;

processing the tracking data to track at least one body part;

dynamically updating kinematic state tracking data based on the tracking of the at least one body part and a kinematic model of the at least one body part;

using the kinematic model and the kinematic state tracking data to generate a predicted future kinematic state of the at least one body part; and controlling operation of the XR device based on the predicted future kinematic state by dynamically selecting, based on the predicted future kinematic state, a subset of the plurality of sensors for tracking of the at least one body part, wherein the plurality of sensors comprises a plurality of cameras of a multi-camera object tracking system of the XR device, and selection of the subset is based on at least one of:

a camera of the plurality of cameras predicted to have the at least one body part closest to a center of a field of view of the camera;

a camera of the plurality of cameras predicted to have a least occluded view of the at least one body part; or a camera of the plurality of cameras predicted to have a clearest view of a predetermined portion of the at least one body part.

18. The XR device of claim 17, wherein the XR device is a head-wearable XR device, and the at least one body part comprises at least part of a hand of a user of the XR device.

19. A non-transitory computer-readable storage medium, the non-transitory computer-readable storage medium including instructions that when executed by at least one processor, cause the at least one processor to perform operations comprising:

accessing tracking data captured via one or more sensors of a plurality of sensors associated with an extended reality (XR) device;

processing the tracking data to track at least one body part;

dynamically updating kinematic state tracking data based on the tracking of the at least one body part and a kinematic model of the at least one body part;

using the kinematic model and the kinematic state tracking data to generate a predicted future kinematic state of the at least one body part; and controlling operation of the XR device based on the predicted future kinematic state by dynamically selecting, based on the predicted future kinematic state, a subset of the plurality of sensors for tracking of the at least one body part, wherein the plurality of sensors comprises a plurality of cameras of a multi-camera object tracking system of the XR device, and selection of the subset is based on at least one of:

a camera of the plurality of cameras predicted to have the at least one body part closest to a center of a field of view of the camera;

a camera of the plurality of cameras predicted to have a least occluded view of the at least one body part; or a camera of the plurality of cameras predicted to have a clearest view of a predetermined portion of the at least one body part.

20. The non-transitory computer-readable storage medium of claim 19, wherein the XR device is a head-wearable XR device, and the at least one body part comprises at least part of a hand of a user of the XR device.

\* \* \* \* \*